United States Patent [19] [11] 3,803,561
Yucius [45] Apr. 9, 1974

[54] PROGRAMMABLE CONVEYING SYSTEM

[75] Inventor: Albert C. Yucius, Holbrook, Mass.

[73] Assignee: Systems Engineering & Manufacturing Corp., Canton, Mass.

[22] Filed: Mar. 16, 1973

[21] Appl. No.: 342,099

[52] U.S. Cl. .......... 340/172.5, 214/11
[51] Int. Cl. .......... G06k 17/00
[58] Field of Search ...... 340/172.5; 214/11; 104/88; 209/74, 114, 122

[56] References Cited

UNITED STATES PATENTS

| | | | |
|---|---|---|---|
| 3,725,867 | 4/1973 | Jordan | 340/172.5 |
| 3,260,349 | 7/1966 | Vandermeer | 104/88 |
| 3,576,540 | 4/1971 | Fair et al. | 340/172.5 |
| 3,593,308 | 7/1971 | Fagan | 340/172.5 |
| 3,384,237 | 5/1968 | Leonard | 209/122 |
| 3,356,061 | 12/1967 | Wiggins | 118/2 |
| 3,105,601 | 10/1963 | Smoll | 214/11 |
| 3,198,351 | 8/1965 | Paglee | 214/11 |
| 3,223,255 | 12/1965 | Graybeal et al. | 214/11 |

*Primary Examiner*—Paul J. Henon
*Assistant Examiner*—Paul R. Woods

[57] ABSTRACT

A programmable hoist system is of the station searching type and is readily adaptable to many different program requirements using either a single hoist or multiplicity of hoists. The program instructions are either travel instructions, such as "go to station 10" or non-travel instructions, such as "lift", and can be stored in either a read only memory (ROM) or on magnetic or paper tape. An eight bit instruction code is preferably used with a portion of the code being used to indicate whether the instruction is a travel or non-travel instruction. In one embodiment two bits of the code are ONES to designate a non-travel instruction with the remaining bits being decodable into 63 predetermined non-travel instructions. For travel instructions the two bits referred to above are not both ONES and the entire eight bit code in binary coded decimal (BCD) can identify up to 100 different stations.

15 Claims, 29 Drawing Figures

PATENTED APR 9 1974 3,803,561

SHEET 17 OF 21

3,803,561

PROGRAMMABLE CONVEYING SYSTEM

FIELD OF THE INVENTION

The present invention relates in general to a programmable conveying or hoist system. More particularly, the present invention relates to a programmable conveying system of the station searching type. A predetermined sequence of program instructions are stored in a read only memory, for example, and control the movement of one or more hoists from station-to-station and also control on-station movements.

In some prior art hoist systems each of the plurality of stations associated therewith has a decoding means for indicating that the hoist is at station 10, for example. In such a system each and every station must include a relatively complex dog and track system for decoding and thus the overall systems becomes more complex than is desired. Alternatively, with the searching system of this invention, it is not necessary to decode each and every station that is passed, but only necessary to determine the number of stations passed from some original starting point. There are disadvantages associated with prior art searching systems. For example, some of these systems do not provide a sufficient number of interlocks to prevent erroneous operation. Also, these known systems are not readily expandable and if there is a new programming requirement many times the system has to be redesigned from a basic starting point. Another drawback with these known systems is that if the system goes out of synchronization such as by not recording the passing of a station, it is difficult for the system to resynchronize itself, and usually the system is returned to its initial starting station, and the semi-processed word is scrapped or stripped and recycled starting at base position.

Accordingly, one object of the present invention is to provide an improved programmable conveying or hoisting system of the station searching type.

Another object of the present invention is to provide a system as set forth in the preceding object and that is readily expandable and can accommodate many program instructions.

A further object of the present invention is to provide a programmable conveying system that is characterized by a sufficient number of fault interlocks and can be readily easily resynchronized if the system loses synchronization.

SUMMARY OF THE INVENTION

To accomplish the foregoing and other objects of the present invention the conveying system of the present invention controls the movement of one or more wagons associated with the system between stations and at a station. The wagon can be controlled manually or automatically. In the manual mode of operation the operator can control such operations as lifting or dropping. Manual control of forward and reverse operation is also possible.

In one embodiment of the invention the system comprises means preferably in the form of a read only memory (ROM) or magnetic tape unit for storing a plurality of multi-bit instruction codes including travel instruction codes and non-travel instruction codes, means for successively reading and decoding each instruction code in sequence and counter means responsive to passage of a station for continuously registering a count representative of the location of the wagon at all times. With this system it is not necessary to decode the identity of each station but only the passage of a station and compare that count continuously with a destination count representative of a destination station.

In accordance with one aspect of this invention the means for reading and decoding each instruction code comprises means for decoding a portion or field of the instruction code to determine if the code is a travel or non-travel instruction code. If one system, for example, an eight bit code is employed and two bits of the code are examined; if they are both ONES it is a non-travel instruction code if they are not both ONES it is a travel code. Thus, if the code is a non-travel code, the remaining six bits are decodeable into a maximum of 64 codes representative of such non-travel instructions as lift, drop, lift with spray, etc. If the two field bits are not both ONES then the entire instruction code is decodeable in BCD to designate up to 100 different stations in the illustrated embodiment. After completion of an instruction means are provided for incrementing the storage means to consider the next instruction code. The system also comprises lift logic, drop logic, forward and reverse control logic, speed control logic and electromechanical interface means.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
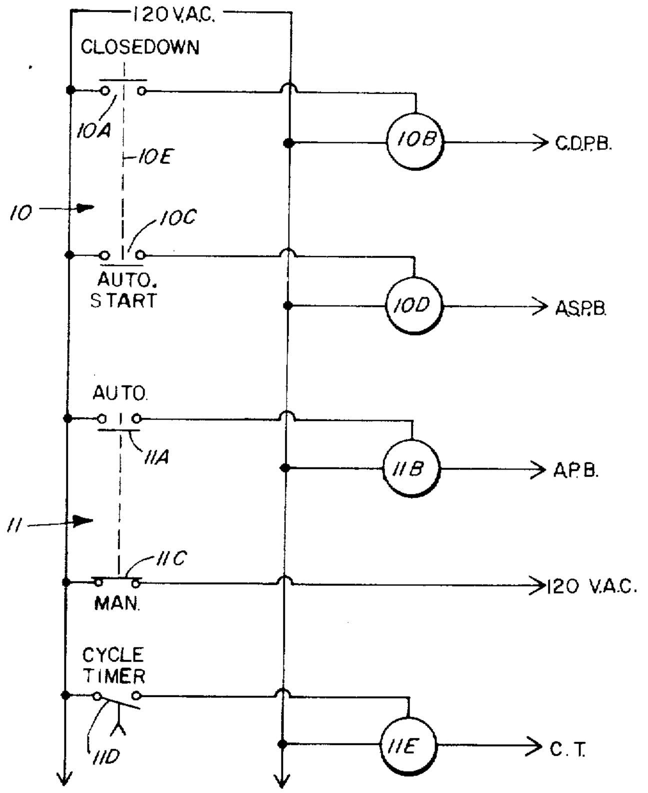
FIG. 1 is a schematic diagram showing the automatic and manual control buttons for the system of this invention.

FIG. 1 shows two control buttons 10 and 11, both of which receive 120 VAC power. Switch 10 includes a close-down contact 10A which couples to logic interface 10B, and an autostart contact 10C which couples to logic interface 10D. Similarly, switch or button 11 includes an auto contact 11A which couples to logic interface 11B, and a manual contact 11C. All of the logic interfaces 10B, 10D and 11B also receive power directly from one side of the 120 VAC source.

When contact 10A, for example, is closed, contact 10C which is mechanically coupled thereto as shown by dashed line 10E, opens and the 120 VAC signal coupled by way of contact 10A generates at the output of logic interface 10B a logical ONE signal. Thus, depression of contact 10A causes the CDPB (close-down push button) signal to go high. Similarly, depression of the contact 10C causes the ASPB (auto-start push button) signal to go high and closing of contact 11A causes the APB (auto push button) signal to go high. When the contact 11C is closed, a 120 VAC manual signal is generated. Each of the signals shown in FIG. 1 shall be discussed in more detail hereinafter as to its functional use in the system of this invention.

FIG. 1 also shows a contact 11D which couples to logic interface 11E. When the cycle timer (see FIG. 3) has been actuated, the contact 11D remains open until the cycle time is completed. Upon completion of the cycle time contact 11D closes and the cycle timer (CT) signal goes high thereby indicating a completion of the cycle time. The cycle time that is used is a function of any one particular system. However, when there is a multiplicity of hoists being used the cycle time that would be used would the cycle time of maximum duration of any one of the hoists.

Throughout the following detailed description there are a number of different logic symbols that are shown. The function of each of these logic symbols shall be explained as they are introduced. However, for a more detailed explanation of the specific construction and operation of each of these logic blocks reference is made herein to the Tenor series 700 and 720 data sheets (Tenor Company, Milwaukee, Wis.) which show in detail the specifications associated with these different logic symbols.

Figure 2:
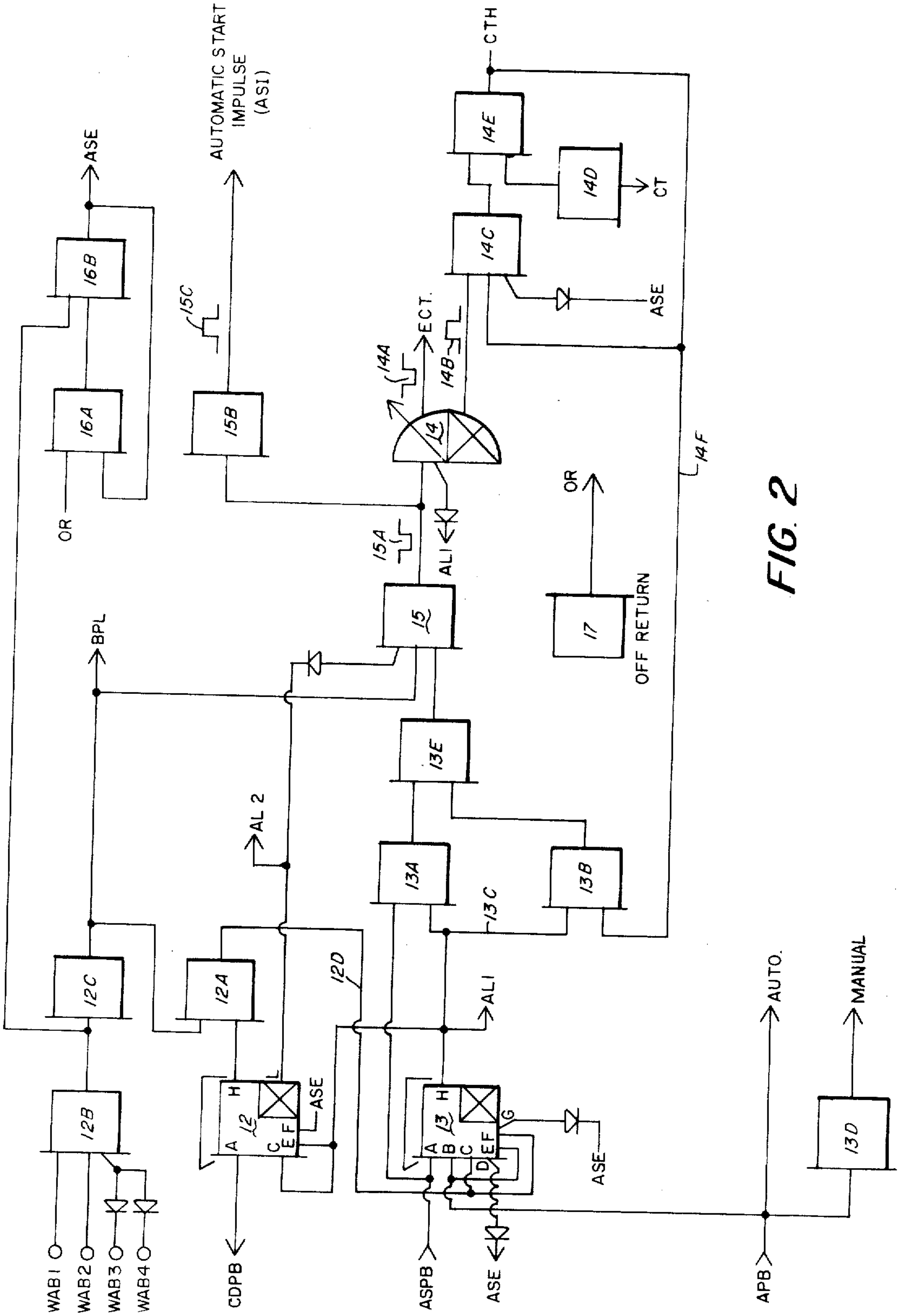
FIG. 2 shows the logic for controlling the cycle time of the system and initiating the cycle time.

FIG. 2 is a diagram of the logic that is associated with the control buttons shown in FIG. 1. FIG. 2 generally comprises sealed AND's 12 and 13, delay timer 14, and a plurality of logic gates. The sealed AND's 12 and 13 each have four set inputs A–D, and three reset inputs E–G, an assertion output H and a negation output L. A high input on terminals A–D causes a high level on output H. When the sealed AND's are reset, the H output goes low and L output goes high. Thus, sealed AND 13 has its AL1 output go high when ASPB, APB and the output of NAND gate 12A are all high. A low input of any of the inputs of a NAND gate such as NAND gate 12A causes a high output. A low output from a NAND gate is obtained when all inputs are high. Thus, the sealed AND 12 must be in its reset condition with its H output low in order for the output of NAND gate 12A to be high. Under that condition, sealed AND 13 is set and gates 13A and 13B, both of which are NAND gates are enabled by way of line 13C.

The APB signal is coupled to other parts of the system and is identified as the auto-signal. This signal is coupled by way of inverting NAND gate 13D to a manual output signal which is also used in other parts of the system of this invention.

Gate 13A receives in addition to the AL1 signal, the ASPB signal and when that signal is present and there is also a high input on line 13C the output of gate 13A is low which in turn causes the output of gate 13E, which is also a NAND gate, to be high. This high input is coupled to one of the inputs of control gate 15. A second input to gate 15 is coupled from the L output of sealed AND 12. When the CDPB signal is not present because the system is not yet to be closed down then the L output is high enabling gate 15.

FIG. 2 also shows another NAND gate 12B which has a low output when all of its inputs are high or when all wagons are at their base position and thus all the WAB (wagon at base position) signals are high. The low output of gate 12B is inverted to a high output by gate 12C and this high output is coupled to the third input of gate 15. The output of gate 12C is the BPL or base position lamp output which is high when all wagons are at their base position.

Thus, when we are in the automatic mode of operation with ASPB and APB both present, when we are at base position, and when we are not in the close-down mode, the output of gate 15 is low. This output is coupled to delay timer 14 and when the input to the delay timer is low it is in readiness for use.

Prior to the wagon or wagons arriving at base position, the output of gate 15 was high. The waveform 15A shows a typical output for gate 15. This output is coupled by way of inverter 15B and the output of inverter 15B is designated the automatic start impulse (ASI) output. The ASI signal is coupled to the non-travel instruction logic shown in FIG. 13 and causes an incrementing of the memory so as to move the system out of the base position. When this occurs the BPL signal goes low and the output of gate 15 goes high as indicated in waveform 15A. Waveform 15C shows a typical ASI signal.

The waveform 15A which is coupled to delay timer 14 has a positive going excursion that initiates the timing interval of timer 14. The output 14A of timer 14 remains low during the time period and goes high at the end of the time period. This signal is labeled as the energize cycle timer ECT) signal. The cycle timer is energized at the end of this delay period when the ECT signal goes high (see FIG. 3). The opposite output 14B of timer 14 is high during the short time interval of timer 14 and then goes low thereafter. When the signal on line 14B goes low, this indication is inverted by gate 14C to a high output. With the cycle timer energized, the CT signal is low and thus the output of gate 14D is also high. The two high inputs to gate 14E cause a low CTH (cycle time hold) signal which is coupled back by way of line 14F to gate 13B. This action in turn latches in the delay timer and maintains output line 14B at a ground level. When the cycle timer times out the CT signal goes high, the output of gate 14D goes low, and the CTH signal goes high resetting the gate 15 by way of gates 13B and 13E and permitting a further initiation of the cycle timer once the base position is reached for all wagons. In most instances, the CTH signal goes high and must wait for the BPL signal to go high before the next cycle can start.

FIG. 2 also shows gates 16A and 16B which are used to generate an automatic start enable (ASE) signal. An off return (OR) gate 17 is also used in conjunction with these gates. When the system is powered up the output of gate 17 has a delayed positive going excursion. Referring to gates 16A and 16B, when the output of gate 12B is low because all wagons are at base position then the output of gate 16B is high enabling the automatic starting of the sequence (see also input D of gate 13). If the OR signal is still high when the base position is left gate 16A latches in the ASE signal. If power is lost and the OR signal goes to ground then the ASE signal goes low and acts as a reset on certain of the gates of the system such as the sealed AND's 12 and 13.

If the CDPB signal is present to signal a system closedown, the H output of gate 12 is high and when the BPL signal comes high, and only then, the sealed AND 13 is reset by way of line 12D thereby inhibiting further automatic operation and any further recycling.

Figure 3:
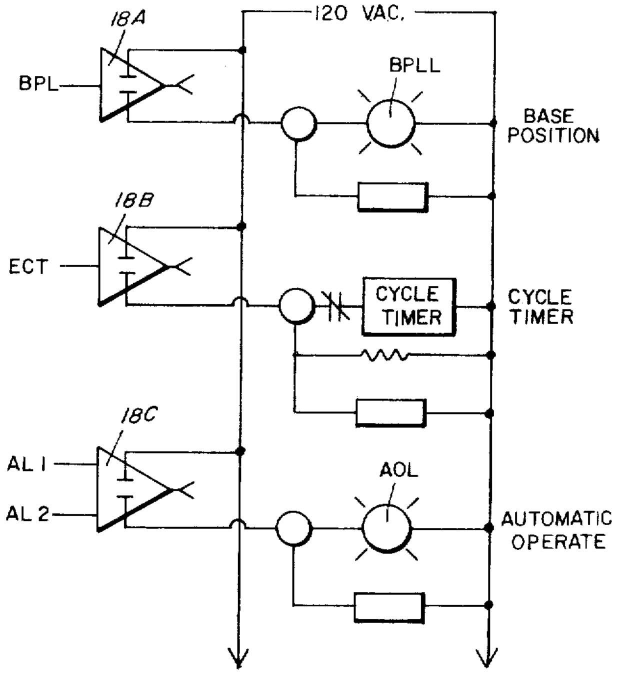
FIG. 3 is a schematic diagram showing the cycle timer and indicator lamps associated with the logic of FIG. 2.

In FIG. 3 there are shown three drive gates 18A, 18B and 18C. Gate 18A receives the BPL signal and its output illuminates a base position lamp BPLL. The drive gate 18B has its output coupled to the cycle timer and gate 18C has its output coupled to an automatic operate lamp (AOL). Lamp AOL can be illuminated from either the AL1 or AL2 signals of FIG. 2. In FIG. 3, 120 VAC is coupled, as shown, to the gates 18A, 18B and 18C and also to the lamps and cycle timer. This arrangement is a typical suggested arrangement in accordance with the use of the logic of the present invention.

Figures 4A, 4B:
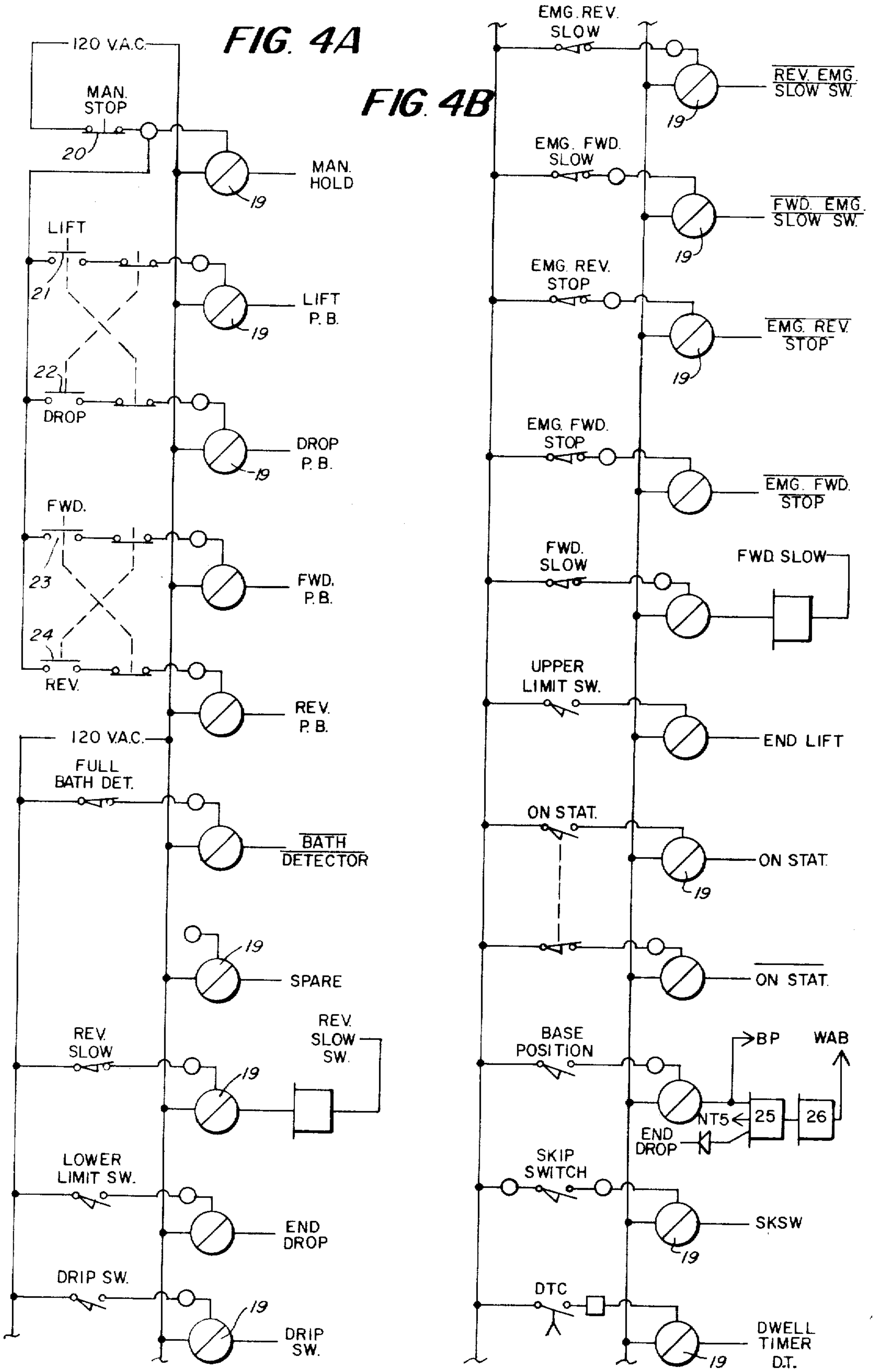
FIGS. 4A and 4B show a plurality of switches associated with a typical conveying system and their corresponding electrical signals wherein some of the switches are as associated with the track and others are manually operable.

Referring now to FIGS. 4A and 4B there are shown a number of input interface circuits for converting the output from certain mechanical switches into corresponding logic levels. Each of the switches has a logic interface 19 associated therewith and interconnected in a conventional manner to cause a high logic level output whenever the switch associated therewith is close coupling the 120 VAC signal to the input of the logic interface 19. For example, when the manual stop switch 20 is in its open position the manual hold output of the associated interface 19 is low. However, when the manual stop switch is closed the manual hold output goes high. The manual lift and drop button includes contacts 21 and 22 which can generate the respective lift PB and drop PB signals. Similarly, the forward and reverse switch includes contact 23 and 24 which respectively may generate the forward PB and reverse PB signals.

FIG. 4 also shows a number of other switches that are associated with the hoist itself or the tanks that the hoist is lifting articles into and out of. Each of these switches couples to the 120 VAC power line and has a logic interface 19 associated therewith. Most of the switches shown in FIG. 4 are normally in a closed position and are tripped to an open position. For example, the full bath detector switch is normally closed and during the drop operation the switch will be opened to generate the bath detector signal. Other switches shown in FIG. 4 that operate similarly are the reverse slow switch, emergency reverse slow switch, emergency forward slow switch, emergency reverse stop switch, emergency forward stop switch and forward slow switch. The lower limit switch is normally in an opened position as shown in FIG. 4 and when this switch is closed during the dropping operation an END DROP signal is generated. The drip switch is normally in an opened position and momentarily closes when lifting or dropping to give the drip switch signal.

The on station (ON STAT) switch is normally opened and when a station is reached this switch closes generating the ON STAT signal. In FIG. 4 this is actually a two-contact switch which generates both the assertion and negation outputs. The base position switch is also normally opened and closes when the base position station is reached. When that occurs the output of the logic interface 19 goes high enabling gate 25. If the signal NT5, which is the preselected signal designating the base position, (see FIG. 13) is present, and we have an end of drop (END DROP) signal then the output of gate 25 is low and the output of gate 26 is high thereby generating the wagon at base position (WAB) signal indicating that the wagon associated with the logic of FIG. 4 is at its base position. The WAB signal is used as discussed previously in the logic diagram of FIG. 2 to enable the gate 12B commencing a re-cycling of operation. The skip switch and dwell timer contact DTC are discussed hereinafter.

Figure 5:
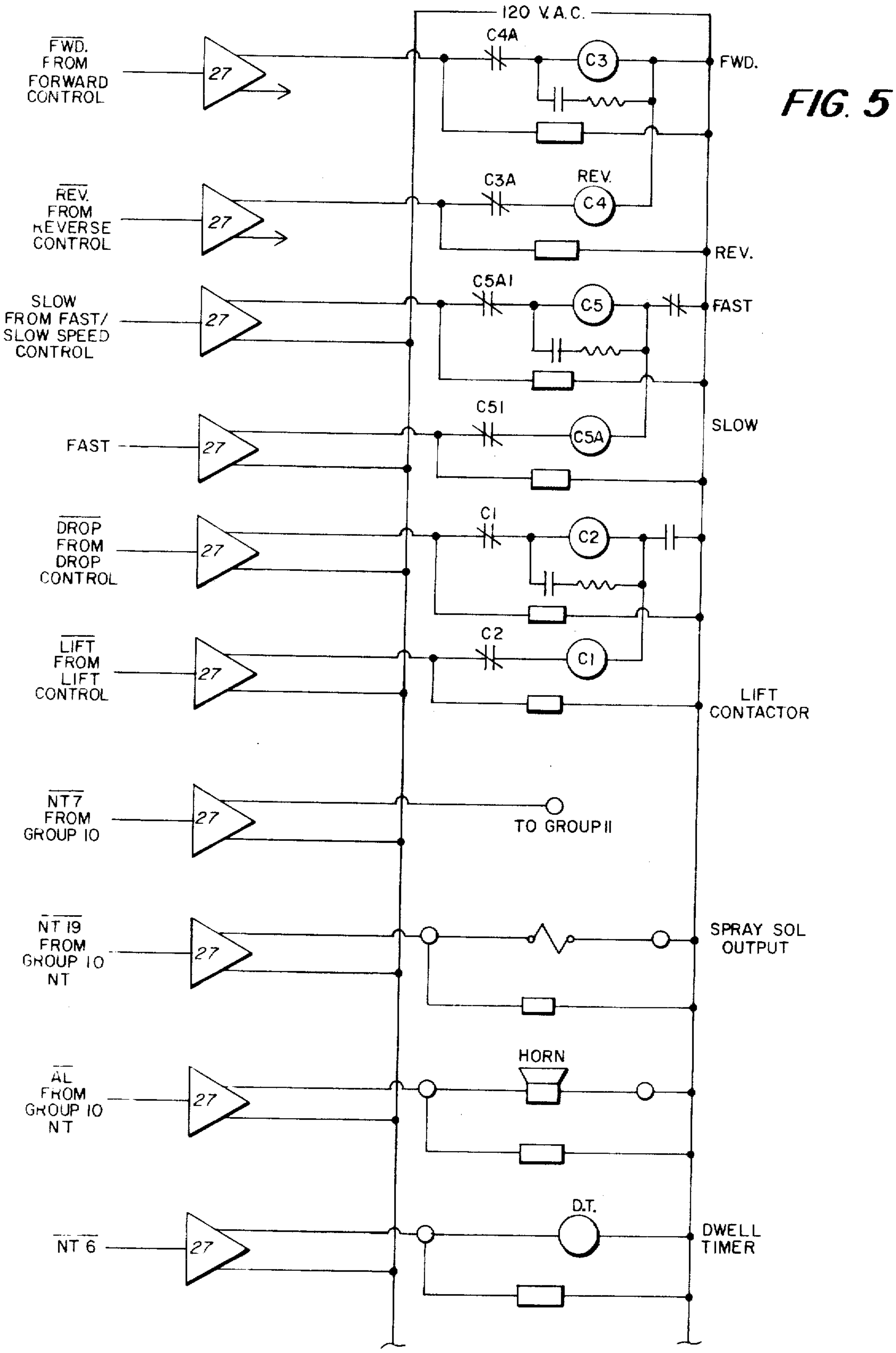
FIG. 5 is a schematic diagram showing the dwell timer and interface circuitry for controlling the operation of the hoist motor.

FIG. 5 shows the electromechanical controls associated with a hoist or wagon. The input signals to the drivers 27 are generated in other parts of the system. For example, the forward and reverse signals are discussed hereinafter and are generated in FIGS. 8 and 9, respectively.

Each of the hoists has a number of contacts associated therewith arranged in a somewhat conventional manner. For example, when a forward signal is present contact C3 of the motor closes enabling forward operation thereof. When the reverse signal is present the contact C4 is closed enabling reverse operation. The contacts C3A and C4A associated with contacts C3 and C4 respectively, provide an interlock so that when contact C3 is closed its associated contact C3A opens preventing any erroneous reverse operation. Similarly, the contacts C5 and C5A provide either fast or slow operation for the hoist. The drop and lift signals coupled to drivers 27 operate the contacts C2 and C1, respectively, to enable dropping and lifting.

There are three possible types of non-travel instructions, i.e. active – NT1 lift; passive – NT7 advance alternate loader; and combination active and passive – NT19 lift with spray.

Figure 6:
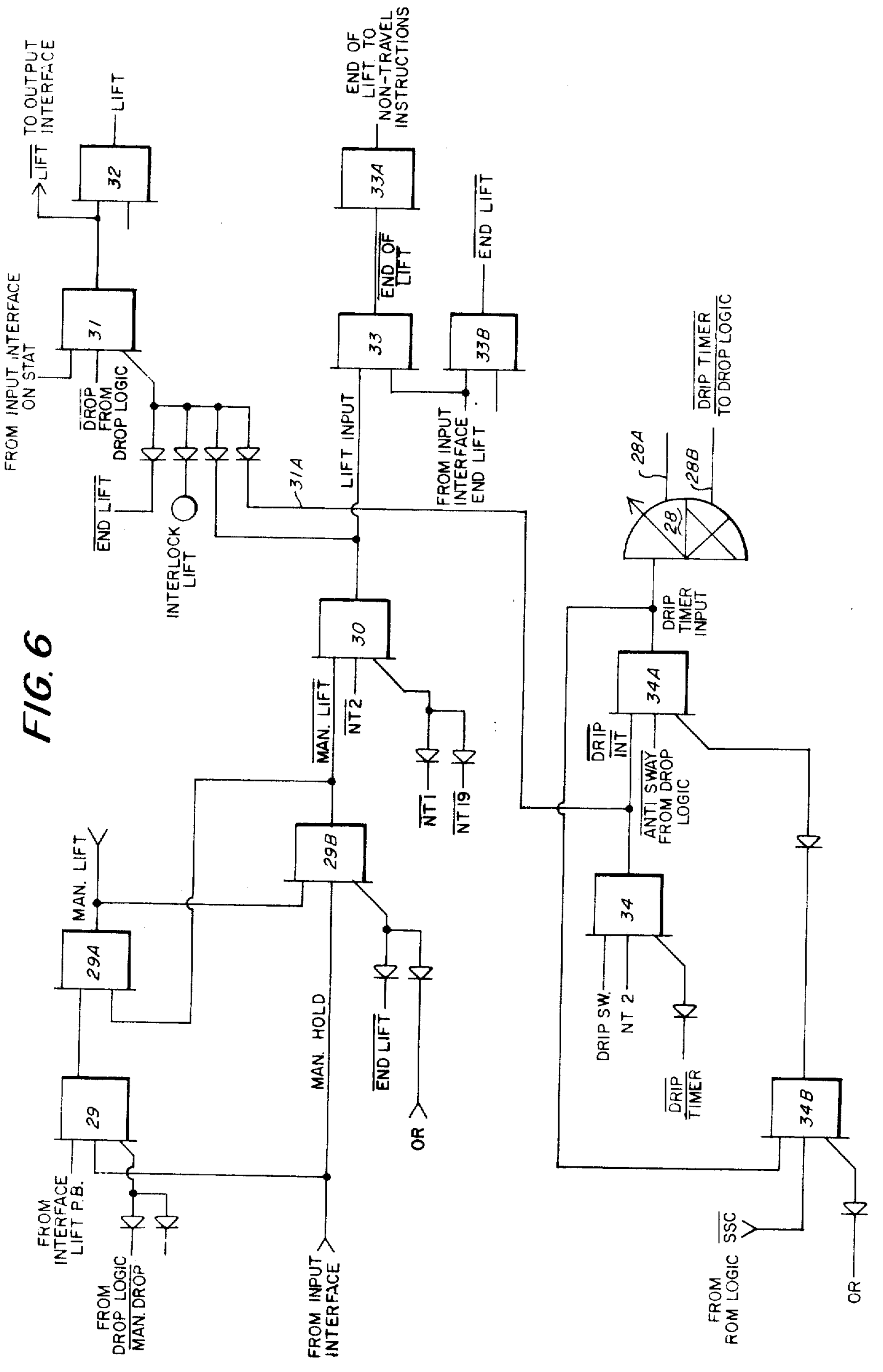
FIG. 6 is a logic diagram of the lift logic of this invention.
Figure 7:
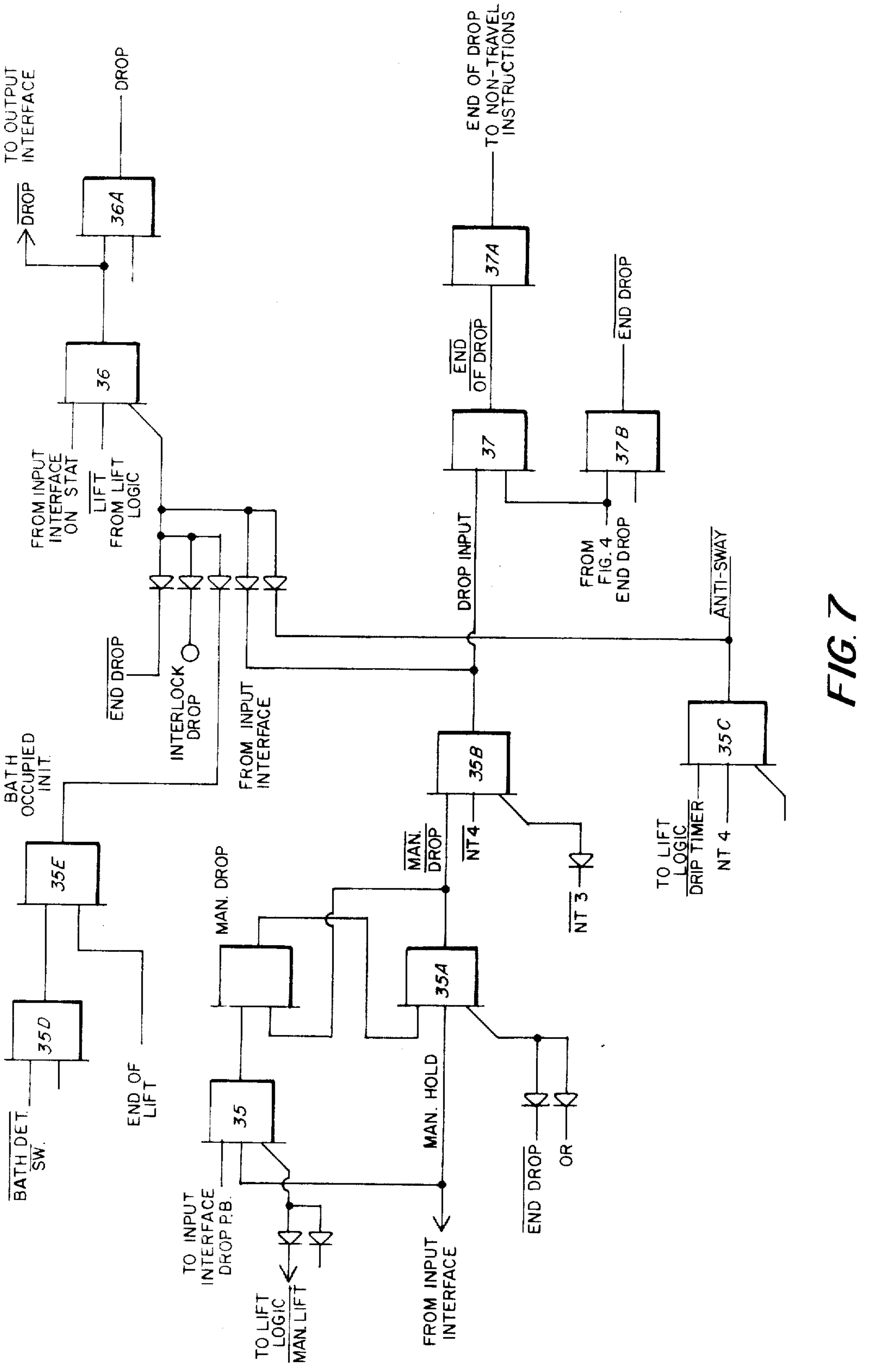
FIG. 7 is a logic diagram of the drop logic of this invention.

FIG. 7 shows the lift logic of the present invention for generating a lift signal for driving the contact C1 (see FIG. 5) of the hoist motor to cause a lifting thereof, and an end of lift signal which is coupled to the non-travel instruction logic of FIG. 13. The logic of FIG. 6 also includes a drip timer 28 which is enabled by the lift with drip instruction which is non-travel instruction 2 (NT2). This timer is also used for a drop and antisway function (see FIG. 7) which is non-travel instruction 4 (NT4).

The enabling of gate 29 is provided when the lift PB signal is high, the manual drop signal is low indicating that we are not manually dropping, and the manual hold signal is high indicating that we have not depressed the manual stop button 20 shown in FIG. 4. The output of NAND gate 29 is low, the output of NAND gate 29A is high and if we are not yet at an end of lift, gate 29B has all high inputs and thus a low output ($\overline{\text{MAN LIFT}}$). In FIG. 6 this output signal from gate 29B is the manual lift-signal indicating that there is a manual lift. The NAND gate 30 functions as an OR gate, in effect, and when any of the inputs go low a lift is enabled, provided other conditions are satisfied. The output of gate 30 is high during the non-travel instructions NT1, NT2 and NT19 (see Table I).

Gate 31 controls the lift and the duration thereof. If all inputs to gate 31 are high then a lift command is generated. This condition is satisfied when the output of gate 30 is high, line 31A is high because the drip switch has not been closed yet, END LIFT is not yet present, DROP is not present and the wagon is on station. Under these conditions the output of gate 31 is low and the output of gate 32 is high indicating a lift operation.

This lift operation can be terminated, for example, when the upper limit switch shown in FIG. 4 closes generating an end of lift (END LIFT) signal causing the output of gate 32 to go low. The operation of the drip switch, as discussed hereinafter, can also cause an end to the lift operation.

The output of gate 30 also couples to one input of gate 33. If any of the inputs to gate 30 are low, gate 33 is enabled and when an end of lift is sensed (see FIG. 4) the output of gate 33 goes low and the output of gate 33A goes high indicating an end of lift. This signal is coupled to the non-travel instruction logic of FIG. 13. The end lift signal from the switches of FIG. 4 is also coupled by way of an inverter 33B which generates the negation signal $\overline{\text{END LIFT}}$.

FIG. 6 also shows a drip timer 28 and its associated logic which includes a gate 34 which is only enabled during non-travel instruction 2 (lift with drip). Initially when in the automatic mode and lifting the output of gate 34 is high and the output of gate 34A is low. This low input to timer 28 effectively resets the timer whereas a positive transition to the input commences the time interval. The assertion output 28A of timer 28 is initially high, goes low during the time interval and reverts to its high state at the end thereof. The negation output 28B is the complement of output 28A.

When the drip switch closes after a predetermined lift period gate 34 is enabled and its output goes low. This signal is coupled by way of line 31A to stop the lift and is also coupled to gate 34A to cause its output to go high enabling the commencement of the drip timer interval as defined by timer 28. The output of the drip timer is coupled to the drop logic of FIG. 7 which is discussed hereinafter. During the interval defined by the drip timer 28 lifting is inhibited until the interval is over, at which time the output of timer 28 which couples to gate 34 causes the line 31A to go high permitting further lifting. When the upper limit switch is reached then the lifting stops, the memory sequences and the next instruction can be carried out. The gate 34B shown in FIG. 6 is a latching gate and the signal SSC is coupled thereto for permitting a resetting of the timer 28 during the memory step interval, as discussed in more detail hereinafter.

The drop logic shown in FIG. 7 is quite similar to the lift logic shown in FIG. 6 and thus will not be discussed in great detail. The manual drop is initiated when the drop pushbutton (DROP PB) signal is high, manual hold is high and there is no manual lift, thereby enabling gate 35 (output low). If we are not yet at an end of drop gate 35A is also enabled and its output is low. The gate 35B functions as an OR gate in a similar manner to gate 30 of FIG. 6, thus, dropping is permitted during non-travel instructions 3 and 4 and also when the manual drop button is used. Under anyone of those conditions the output of gate 35B is high. If we do not have a non-travel instruction 4 (NT4) gate 35C also has a high output and if we have not reached the bath detector switch as determined by gates 35D and 35E nor reached an end of drop, one input to gate 36 is high. If we are also not lifting and are on station, gate 36 is enabled and its output goes low. This output is coupled by way of gate 36A which generates the DROP signal. The output of gate 36 is the $\overline{\text{DROP}}$ signal. The gates 37, 37A, and 37B of FIG. 7 are similar to the gates 33, 33A and 33B of FIG. 6 and operate in a similar manner to generate the END DROP and $\overline{\text{END DROP}}$ signals. The END DROP signal to gates 37 and 37B is coupled from the circuitry shown in FIG. 4.

When the operation is in non-travel instruction 4 which is the drop with anti-sway instruction, the NT4 signal is high and gate 35C is enabled with its output going low. This is referred to as the ANTI-SWAY signal and when it goes low the drop is delayed. Also, this signal is coupled to the logic of FIG. 6 and in particular to gate 34A for commencing the time interval of timer 28. Thus, timer 28 functions both during the lift with drip and the drop with anti-sway operations. After the interval is completed gate 35C has a high output and dropping may commence if the bath detector switch is not yet activated. Dropping continues until an end of drop switch is reached. Antisway is a pause after arrival on station and before dropping occurs.

Figure 8:
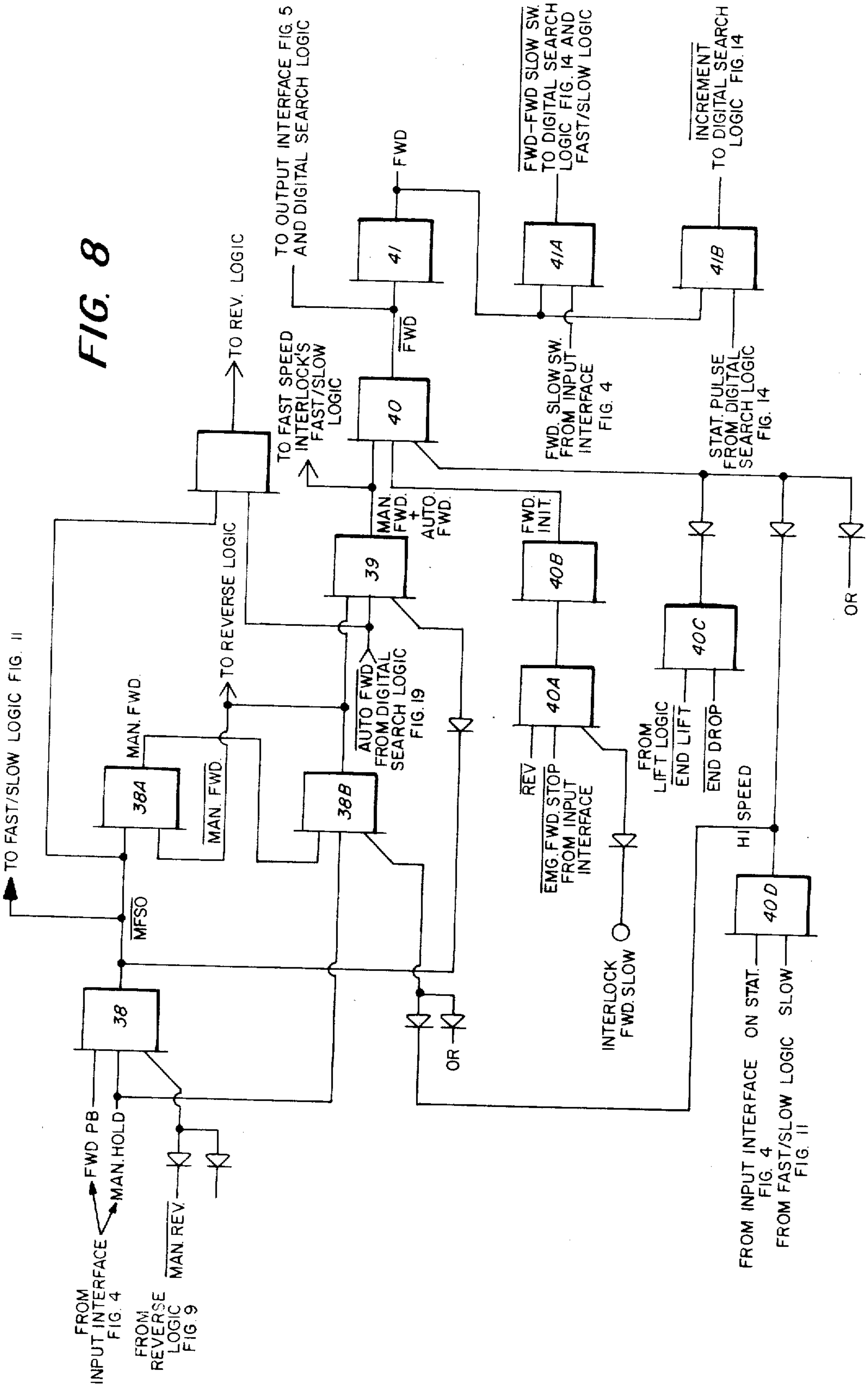
FIG. 8 is a logic diagram of the forward logic of this invention.

The logic of FIG. 8 which is the forward logic is somewhat similar to the logic shown in FIGS. 6 and 7. However, where the lift and drop logic was controlled by non-travel instructions and switch actuations in the automatic mode, the forward and reverse logic is dependent upon the position of the wagon relative to its proximity to its destination.

In FIG. 8 when the FWD PB signal is high, the manual hold (MAN HOLD) signal is high, and we are not in manual reverse (MAN REV), then gate 38 is enabled and its output is low. This signal is referred to as the manual forward slow override signal (MFSO). This signal is referred to hereinafter with reference to the disucssion of FIG. 11. When the output of gate 38 is low the output of gate 38A is high and the output of gate 38B is low, indicating that we are in a manual forward mode of operation. Gate 39 of FIG. 8 is similar to gate 35B of FIG. 7 and functions as an OR gate. Its output is high when either the output of gate 38B is low or when the auto-forward (AUTO FWD) signal is low. The AUTO FWD signal is generated from the logic of FIG. 19.

The gate 40 enables forward operation when all its inputs are high. One input is high when the system is either in manual or automatic forward, and another input is high when gate 40A is enabled and the output of gate 40B is high. This is the case when the emergency forward stop switch has not yet been actuated and the system is not in reverse. The last condition for gate 40 is satisfied when we are either not at an end of lift or not at an end of drop, as indicated by gate 40C and when we do not have the concurrent appearance of the ON STAT and SLOW signals, as sensed by gate 40D.

The forward operation can be stopped if any of the inputs to gate 40 go low. Thus, if the emergency forward stop switch is actuated the output of gate 40A goes high, the output of gate 40B goes low, terminating the forward signal. The forward operation is also terminated when there is a slow signal and the ON STAT signal is present. Under that condition the output of gate 40D is low and forward operation stops.

If we are in a lift operation the forward signal cannot be present because of the low output of gate 40C. However, when an end of lift is reached or an end of drop the output of that gate goes high, permitting forward operation.

The FWD signal at the output of gate 41 couples to gates 41A and 41B. When the FWD signal is present and the forward slow switch (see FIG. 4) is closed, then the FWD–FWD SLOW SW signal is coupled to the logic of FIG. 14 and also the fast-slow logic of FIG. 11. Similarly, gate 41B provides an increment signal used in the counting pulse logic of FIG. 14 when the FWD signal is high and the STAT PULSE signal is generated from the logic of FIG. 14. The operation of gates 41A and 41B will be discussed in more detail hereinafter, with reference to the digital search logic shown in FIGS. 14–19.

Figure 9:
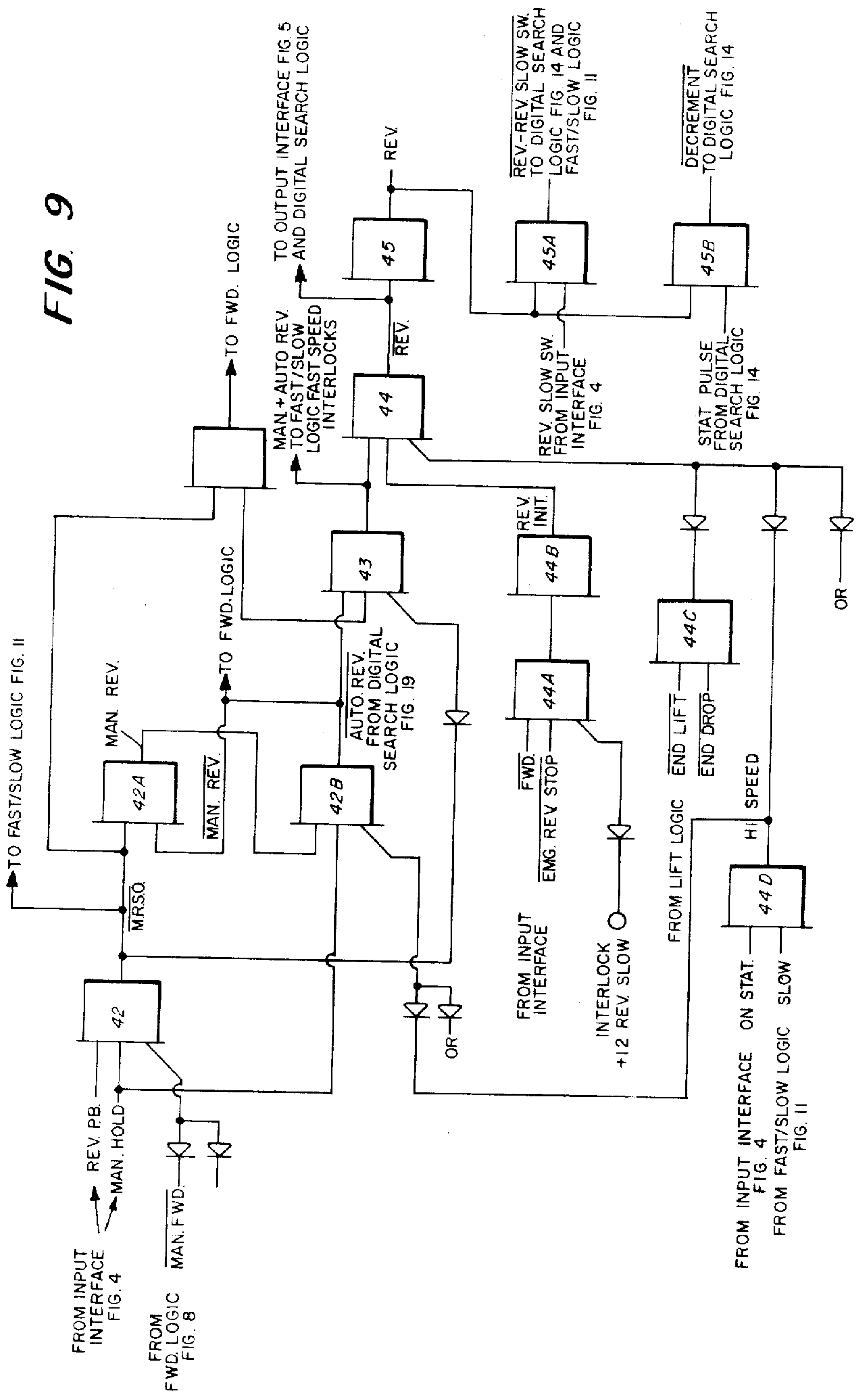
FIG. 9 is a logic diagram of the reverse logic of this invention.

Referring now to FIG. 9 which shows the reverse logic, this is somewhat similar to the forward logic shown in FIG. 8 and thus will not be discussed in great detail. The gates 42, 42A and 42B function similarly to gates 38, 38A and 38B of FIG. 8 to provide a low signal to one input of gate 43 thereby indicating that the system is in manual reverse operation. Gate 44 of FIG. 9 is similar to gate 40 of FIG. 8 and enables reverse operation with a high REV signal at the output of gate 45 when all inputs to gate 44 are high. The gates 44A and 44B are similar to gates 40A and 40B of FIG. 8 and the gates 44D and 44C are similar to gates 40D and 40C of FIG. 8. Thus, reverse operation is enabled in either the automatic or manual mode of operation when the emergency reverse stop switch has not been reached when we are not in FWD, when we are not lifting or dropping, and when we do not have a concurrent SLOW signal and ON STAT signal. Reverse can only commence if we have either an end of lift or end of drop and operation is terminated if we should reach the emergency reverse stop switch. The gates 45A and 45B of FIG. 9 are similar to gates 41A and 41B of FIG. 8 and provide outputs REV–REV SLOW SW and DECREMENT, respectively. Both of these signals are used in the counting pulse logic of FIG. 14.

Figures 10, 11:
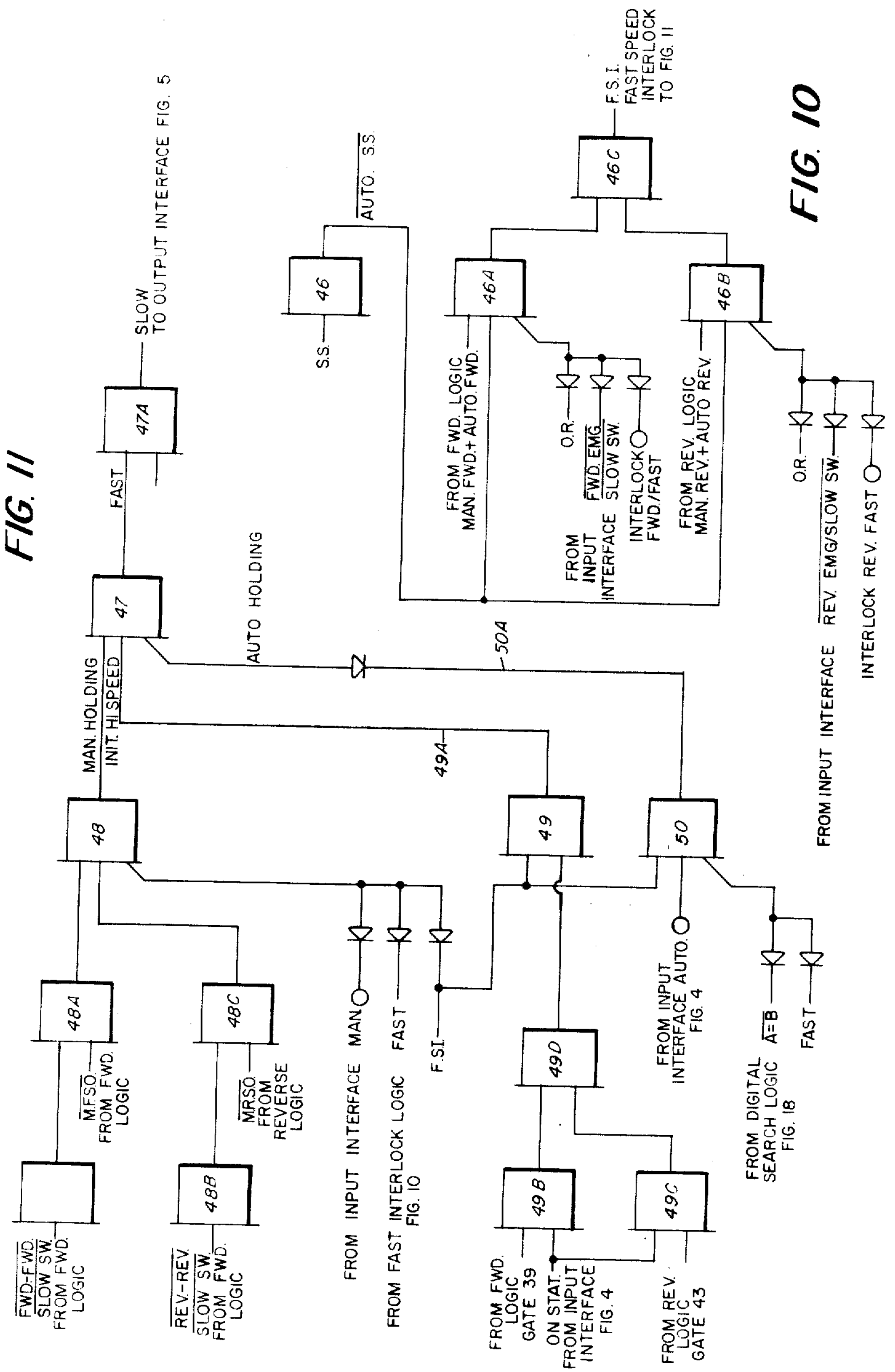
FIG. 10 is a logic diagram of the fast interlock logic of this invention.
FIG. 11 is a logic diagram of the fast/slow logic of this invention.

Referring now to FIG. 10 there is shown the fast interlock logic of the present invention. This logic generates a fast speed interlock (FSI) signal under certain predetermined conditions discussed hereinafter. The gate 46 shown in FIG. 10 receives a single step (SS) signal which is generated from the non-travel instruction logic of FIG. 13. This signal goes high during a travel instruction when the destination is reached (see gate 57 FIG. 13A). When SS goes high, the output of gate 46 ($\overline{\text{AUTO SS}}$) goes low and thus the outputs of gates 46A and 46B are both high providing a low output for gate 46C. This low FSI signal is used as an inhibiting signal in the fast-slow logic shown in FIG. 11 while changing operating commands at the time the program advances.

When the system has not yet reached destination, the SS signal is low and the same inputs to gates 46A and 46B from gate 46 are high, thus enabling gates 46 and 46B. If the system is then in either the manual forward or automatic forward, or the manual reverse or automatic reverse modes of operation, one of the gates 46A or 46B will have a zero output thereby reverting the FSI signal to its high level or its enabling level permitting fast speed operation. If it is assumed that the system is in the forward mode of operation, for example, the FSI signal stays high until the forward emergency slow down switch is actuated at which time the FSI signal goes low. Similarly, if in the reverse mode of operation the FSI signal goes low when the reverse emergency slow down switch is tripped. The function and use of the FSI signal will be discussed in more detail hereinafter with reference to FIG. 11.

FIG. 11 shows the fast/slow logic which includes a NAND gate 47 which has a high output to indicate fast speed operation. This output is coupled by way of gate 47A to provide the SLOW signal. Any low input to gate 47 provides the FAST signal which in turn excludes the slow signal. Conversely, all high inputs to gate 47 drops out the FAST signal and introduces the SLOW signal. The fast signal can be sustained by a low level signal on any of the input lines to gate 47. One of the input lines to gate 47 is for manually holding fast speed operation and is coupled from gate 48. Another input line to gate 47 is for initiating high speed operation and this is coupled from the output of gate 49 via line 49A. A third line 50A to gate 47 is for automatic holding of fast speed operation and this is coupled from the output of gate 50.

If the system is in the manual mode of operation and we are proceeding either forward or reverse then under certain conditions the output of gate 48 is low manually holding the fast speed of operation. For example, if the forward push button is held depressed then the MFSO signal from FIG. 8 is present and the output of gate 48A is high. Because travel is in the forward direction the REV–REV slow switch input to gate 48B is high as is the output of gate 48C. If the FSI signal is also high and we are in manual opration then the output of gate 48 is low holding the fast speed manual operation.

Alternatively, if travel is in the reverse direction the $\overline{\text{MRSO}}$ signal is low and all inputs to gate 48 are high also holding manual fast speed operation.

High speed operation is initiated by way of line 49A FAST the output of gate 49 when in either the manual or automatic forward, or manual or automatic reverse modes of operation and the wagon is on station. Under those conditions either gates 49B or 49C have a zero output and the output from gate 49D is high enabling gate 49 and initiating high speed operation. This operation can be sustained by way of line 50A which is the automatic holding line from gate 50. Gate 50 has a low output continuing fast operation when in the AUTO mode, when fast is high and when the logic of FIG. 18 indicates that the wagon is not yet at destination ($\overline{A=B}$). All the gates 48, 49 and 50 also have the FSI signal coupled to them. This signal permits fast speed operation when it is high. However, if either the forward or reverse emergency slow switches are tripped this signal goes low and reverts speed from fast to slow.

Figures 12, 12A:
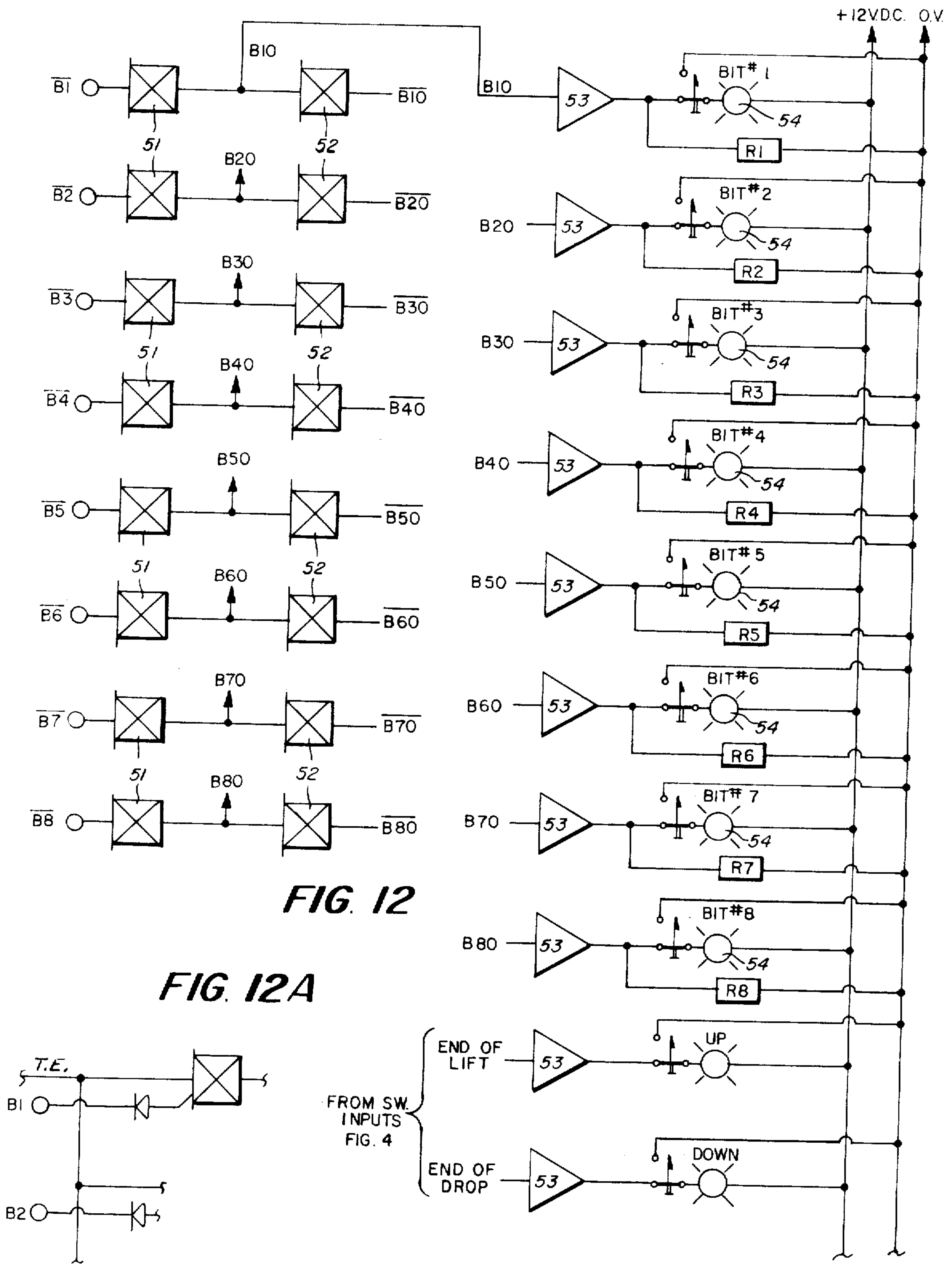
FIG. 12 is a schematic diagram of the instruction drivers and associated readout for read only memory operation.
FIG. 12A is a fragmentary view similar to FIG. 12 for tape operation.
Figure 23:
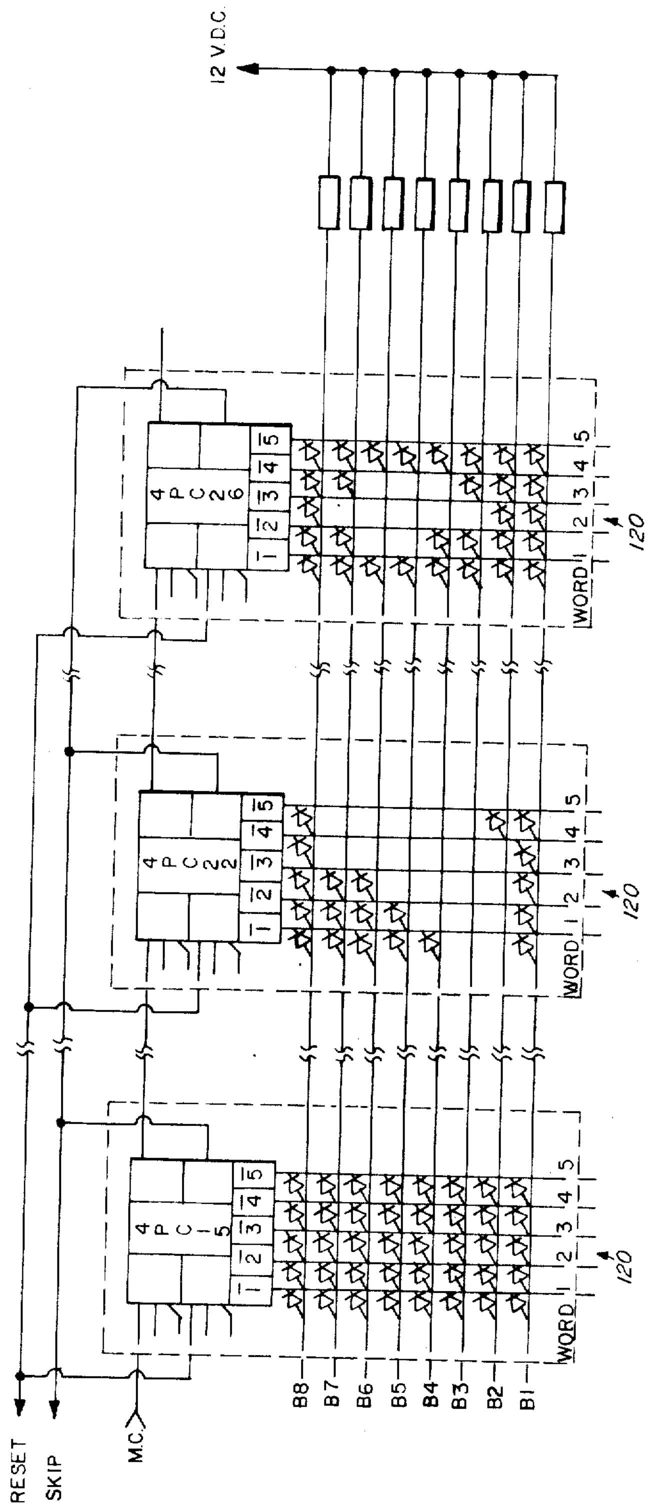
FIG. 23 shows part of the read only memory (ROM) of this invention.

FIG. 12 shows the drivers associated with each bit of the 8 bits of a memory word. FIG. 23 shows a portion of the read only memory (ROM) with the bits B1–B8. These signals are fed, as shown in FIG. 12 by way of inverters 51 and 52 to provide appropriate logic level signals B10–B80 and their negations $\overline{\mathbf{B10}}$–$\overline{\mathbf{B80}}$ which signals are coupled to the non-travel instruction logic shown in FIG. 13. FIG. 12 also shows the lamp drivers 53 which drive eight lamps 54 corresponding to the 8 bits B1–B8. FIG. 12 also includes UP and DOWN lamps coupled by way of drivers 53. The UP lamp and DOWN lamp are energized by END OF LIFT and END OF DROP signals, respectively.

FIG. 12 is a fragmentary view of the instruction drivers used for tape operation. In this embodiment the inverter has two inputs, one being a tape enable (T.E.) signal generated from FIG. 25 discussed hereinafter.

LIFT/DRIP 11010011 (NT62)

Figure 13A:
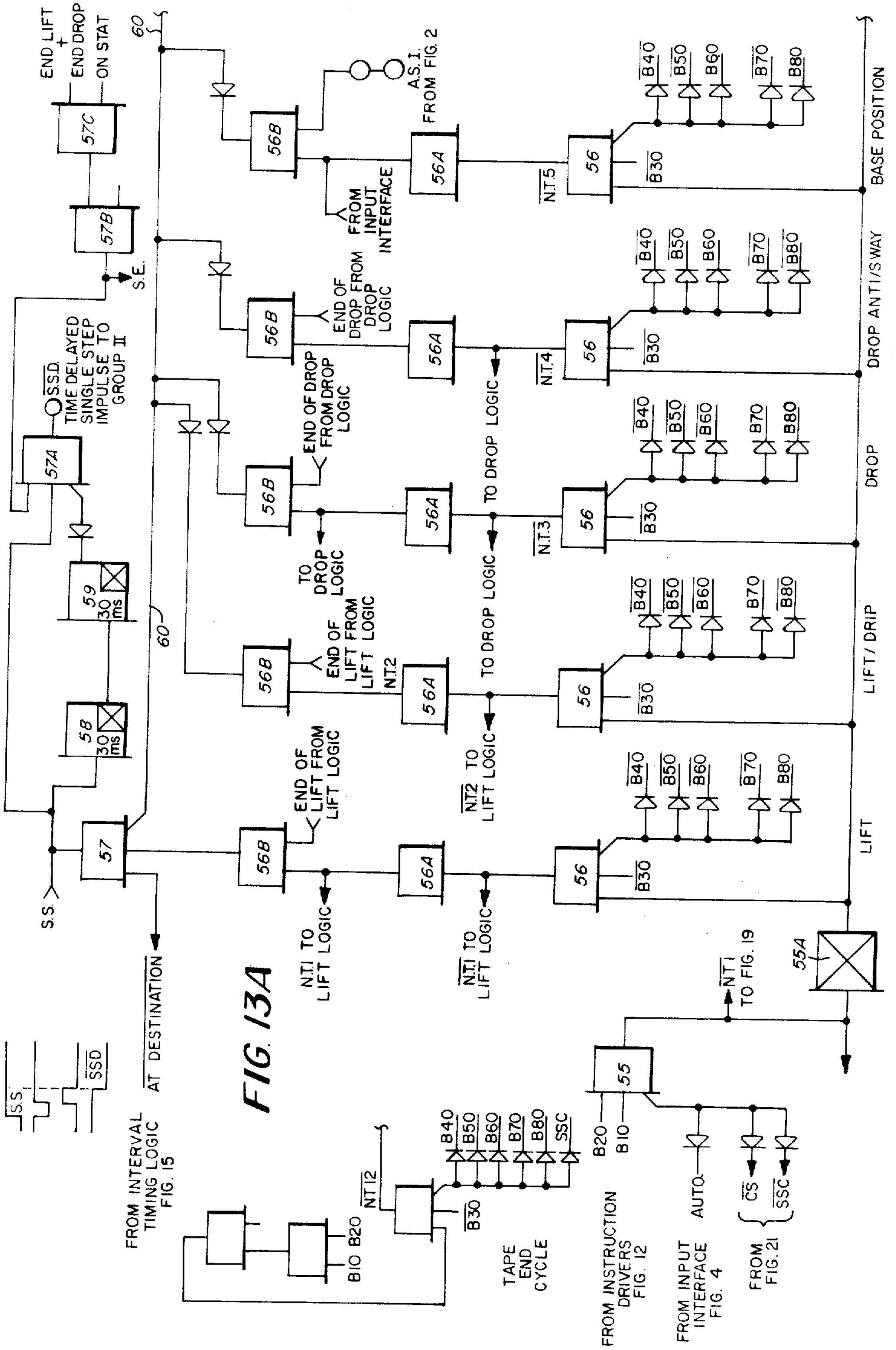
FIGS. 13A, 13B and 13C show the non-travel instruction logic of this invention.
Figure 13B:
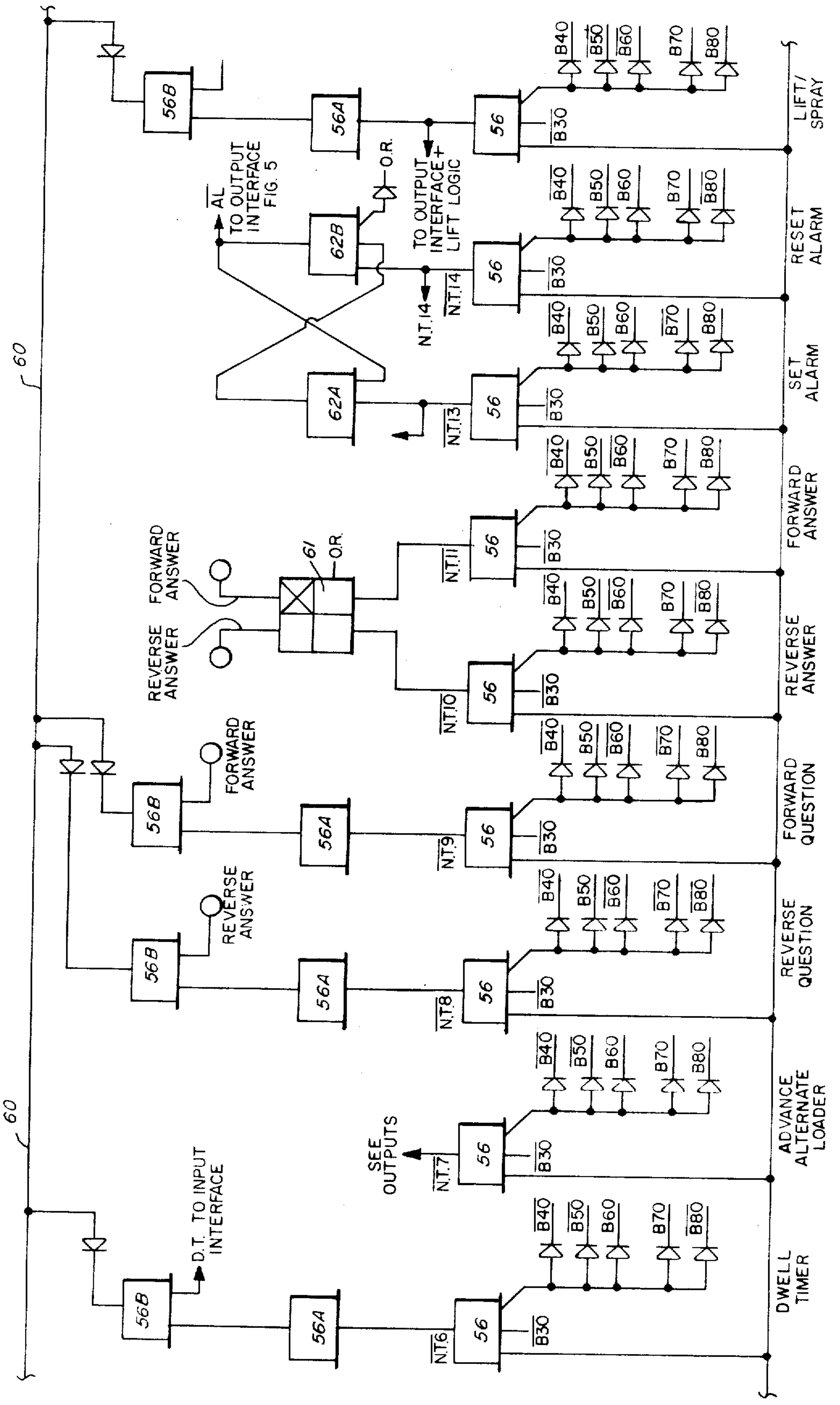
Figure 13C:
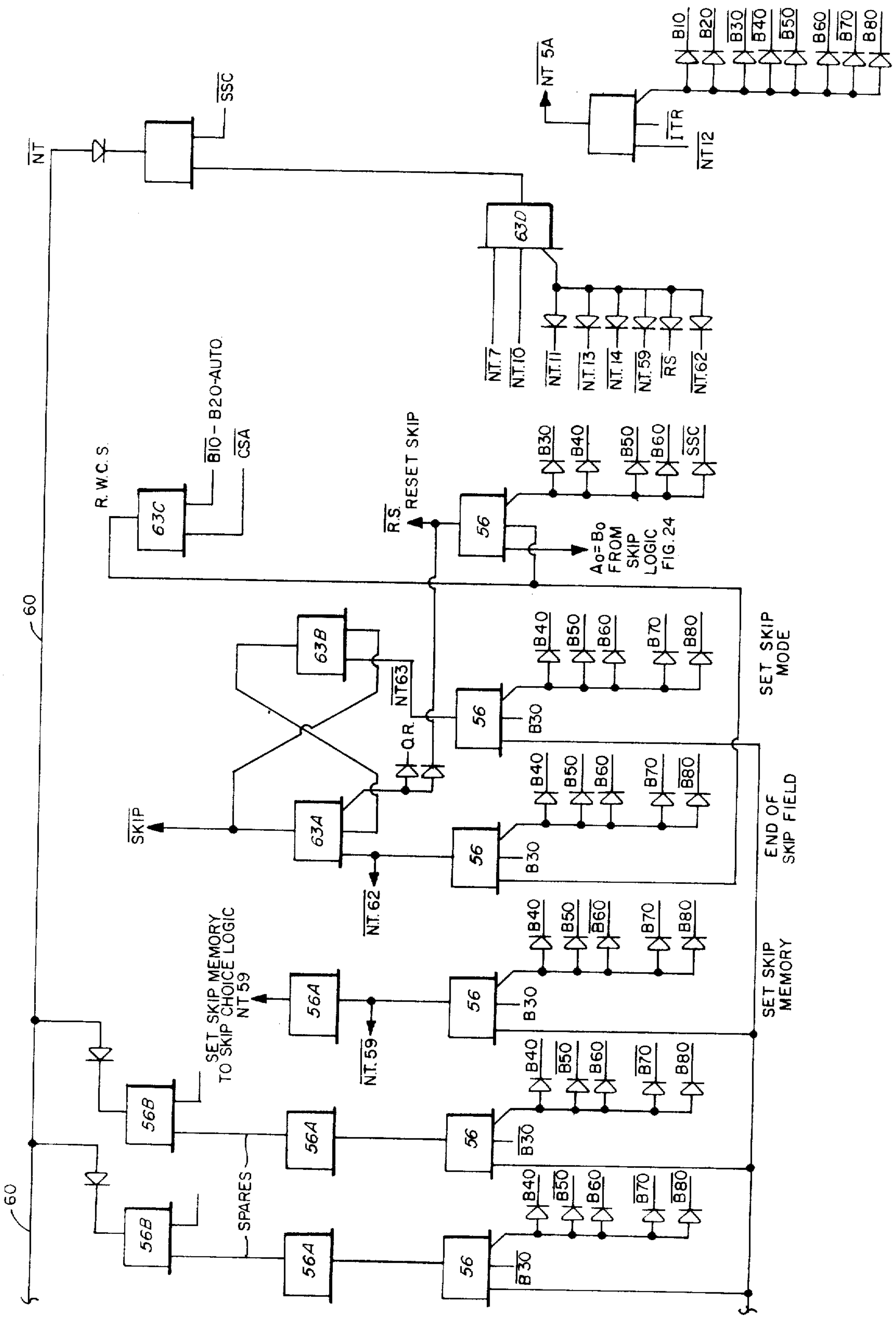

FIGS. 13A, 13B and 13C shown the non-travel instruction logic of this invention. Table I below shows a typical set of non-travel instructions and their associated codes.

TABLE I

| INSTRUCTION | CODE |
|---|---|
| LIFT (NT1) | 11000001 |
| LIFTDRIP (NT2) | 11000010 |
| DROP (NT3) | 11000011 |
| DROP-ANTI-SWAY (NT4) | 11000100 |
| BASE POSITION (NT5) | 11000101 |
| DWELL TIMER (NT6) | 11000110 |
| ADVANCE ALTERNATE LEADER (NT7) | 11000111 |
| REVERSE QUESTION (NT8) | 11001000 |
| FORWARD QUESTION (NT9) | 11001001 |
| REVERSE ANSWER (NT10) | 11001010 |
| FORWARD ANSWER (NT11) | 11001011 |
| END OF CYCLE (NT12) | 11001100 |
| SET ALARM (NT13) | 11001101 |
| RESET ALARM (NT14) | 11001110 |
| LIFT/SPRAY (NT19) | 110110011 |
| SET SKIP MEMORY (NT59) | 11111011 |
| END SLIP FIELD (NT') | 11111110 |
| SET SKIP MODE (NT63) | 11111111 |

In accordance with the present invention two bits of the eight bit code are examined to determine if the code is a travel code or a non-travel code. The bits that are examined are bits B10 and B20. If they are both ONES, the remaining bits B30–B80 define a non-travel instruction. If they are not both ONES all eight bits may be used in BCD to define up to 100 different travel instructions corresponding to 100 discrete stations. FIGS. 13A–13C show means including a plurality of gates 56 for decoding non-travel instructions and means for generating a delayed single step impulse for incrementing the ROM of FIG. 23 in response to either completion of a non-travel instruction or the wagon arriving at destination during a travel instruction. For example, non-travel instruction 1 (NTI) is a lift instruction represented by the code 11000001. Note that the first two bits being ONES designate this a non-travel instruction. A travel instruction code for station 11 is 00010001 and it is noted that the two ZERO bits designate this as a travel instruction which is coupled to the location comparator of FIG. 18.

As previously mentioned, it is the decoding of bits B10 and B20 which identify the type of instruction. These bit inputs are coupled to gate 55 and if we are in the automatic mode and not single stepping or continuous stepping the output of gate 55 is low and the $\overline{\text{NTI}}$ signal is present. The $\overline{\text{CS}}$ and $\overline{\text{SSC}}$ signals are coupled from the circuitry of FIG. 21. This signal is inverted by inverter gate 55A whose output enables each of the decode gates 56 of which there are a plurality, one being associated with each travel instruction. For example, for the lift instruction bits B30–B80 are decoded and when this code is sensed by the appropriate lift gate 56 its output goes low. This signal is coupled by way of gates 56A and 56B to one input of gate 57. However, gate 56B cannot have a low output until an END OF LIFT occurs. During the lift operation END OF LIFT is low and when the end of lift occurs that signal goes high causing a ZERO at the output of gate 56B. Any ZERO input to gate 57 initiates the stepping of the memory to the next instruction. When the output of gate 57 goes high one input to gate 57A is enabled. The positive-going signal from gate 57 is coupled and delayed by means of one-shots 58 and 59. After the delay period which is approximately 60 milliseconds the output of gate 57A goes low provided we are on station and have ended a lift or drop (see gates 57B and 57C), and an $\overline{\text{SSD}}$ signal (negative going pulse) is generated. This pulse is discussed hereinafter with reference to FIG. 21.

Normally, during an operation such as the non-travel instruction NTI all of the inputs to gate 57 are high and thus no step impulse is generated. The completion of any one non-travel instruction generates a low signal by way of line 60 (see also FIGS. 13B and 13C) causing an $\overline{\text{SSD}}$ pulse and eventual incrementing of the memory. With respect to travel instructions, once the destination has been reached the $\overline{\text{AT DESTINATION}}$ signal is coupled by way of line 60A to gate 57 also causing an incrementing of the memory as discussed in more detail hereinafter.

As previously mentioned, Table I indicates the codes associated with each of the non-travel instructions. Each of the gates 56 shown in FIGS. 13A–13C decode their instruction and provide an enabling output. The gates 56B hold this enabling signal which is inverted by gates 56A until a return signal is received at its other input indicating that the instruction being read has been executed and complete. For example, if the dwell timer instruction NT6 is used the associated gate 56B has a high output until the contact of the dwell timer closes indicating the time interval is over and then a low signal is coupled to gate 57 for subsequently incrementing the memory.

The reverse answer instruction NT10 sets a retentive memory 61 and the forward answer instruction NT11 resets this memory. This operation provides a logic answer to the wagon, forward or reverse of the wagon. The answer indicates whether or not the wagon is in an overlapping travel area. This instruction single steps the main memory by way of gates 56B associated with the forward and reverse question instructions NT8 and NT9, respectively, of those hoists to which this output signal is fed.

The forward question and reverse question instructions prevent the main memory from stepping to the next instruction until an answer is obtained from another wagon indicating that it is not in the area into which the wagon will move.

An end of cycle instruction $\overline{NT12}$ is utilized in normal automatic operation to:

A. ROM — reset the memory to set word O as discussed with reference to FIG. 22;

B. Tape Reader — set word O and advance the tape to the beginning of the next program cycle as discussed with reference to FIG. 25.

Non-travel instruction 13 which is the SET ALARM travel instruction sets a memory comprised of intercoupled gates 62A and 62B and eventually generates a horn signal. The non-travel instruction NT14 which is the RESET ALARM travel instruction resets the memory which in turn de-energizes the horn. (See FIG. 5).

The lift with spray non-travel instruction is instruction NT19. This is similar to a lift instruction but is coupled with a spray operation and thus a spray solenoid is energized during the lift. When the upper limit switch is reached the spray solenoid is de-energized (see FIG. 5).

Figure 24:
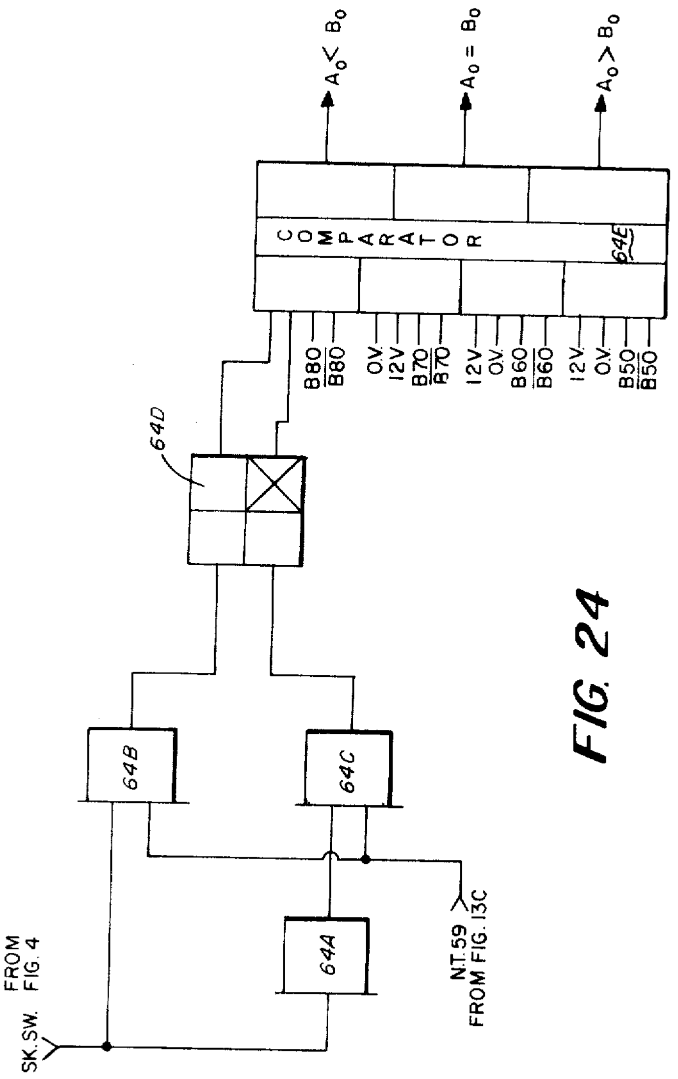
FIG. 24 shows the skip choice logic of this invention.

In accordance with another aspect of this invention, there is provided a skip mode for controlling a skipping through a predetermined number of program instructions. The skip logic is shown in FIG. 24 and associated non-travel instruction logic is shown in FIG. 13C. Table II below shows the skip code of four bits and the sub-routine of four bits. When the skip code is set up the system sequences through the sub-routines until the desired one is reached.

| | SKIP CODE | | | | SUB-ROUTINE | | | |
|---|---|---|---|---|---|---|---|---|
| LOGIC STATE | 1 | 1 | 1 | 1 | φ | φ | φ | φ |
| CHANNEL | 1 | 2 | 3 | 4 | 5 | 6 | 7 | 8 |
| BINARY WT. | | | | | 8 | 4 | 2 | 1 |

φ indicates logic state 1 or 0. To establish the skip code sought, non-travel instruction 59 (NT59) is used. NT 59 also causes a memory step by way of gate 63D. This signal is coupled to the skip logic of FIG. 24 to enable gates 64B and 64C which have complementary outputs depending upon the position of skip switch SKSW. The outputs of gates 64B and 64C couple to retentive memory 64D which in turn couples to a complementary input of comparator 64E. The B50–B80 inputs to the comparator and their negations are compared with a preset code (0 and 12VDC) determined in part by the complementary output of memory 64D. The operation of the skip logic of FIG. 24 is discussed in more detail hereafter After the skip memory is enabled via gates 64B and 64C by NT59 the skip mode may be set by NT63 (11111111). This instruction sets the memory comprised of gates 63A and 63B and generates the SKIP signal which is coupled to the memory timing logic of FIG. 21 to cause a continuous step mode of operation. There are two ways to disable this continuous step mode. Non-travel instruction 62 (11111110) resets the skip memory (END OF SKIP FIELD) with the output of gate 63A going high. This stops the continuous step mode and the NT62 instruction, via gate 63D, steps the ROM to the next instruction. The other way of terminating the skip mode is with the logic of FIG. 24. When skipping through instructions the comparator 64E may reach a comparison between the subroutine bits B50–B80 and the switch input bits controlled in part by switch SKSW, at which time $A_o = B_o$ and the RESET SKIP signal (FIG. 13C) appears, provided the instruction is a skip code instruction (bits B10–B40 all ONES), and gate 63C is enabled (RWCS is present). The RS signal causes the programmer to advance to the next instruction via gate 63D and respond normally to the selected group of instructions.

While in the continuous step mode only RESET SKIP and END OF SKIP FIELD are read. This prevents erroneous responses as the memory steps over unwanted sub-routines within the choice field.

For the selected group instructions the wago traverse is accomplished by comparing a binary coded decimal (BCD) code from a two decade counter with a main memory BCD destination code from the ROM or tape reader and energizing the proper FAST-SLOW and FORWARD-REVERSE contactors (See FIG. 5). The main memory which in the illustrated embodiment is the ROM of FIG. 23 has 8 separate bits or channels. These channels are divided, for travel instructions, into two BCD numbers. Channels 1–4 denote the tens digit choice and channels 5–8 denote the units digit choice. The destination code can only consist of binary code numbers 0 through 9 in the tens digit channel and also in the units digit channel. If the destination code is any other combination of digits, the instruction is not considered a travel instruction.

Figure 14:
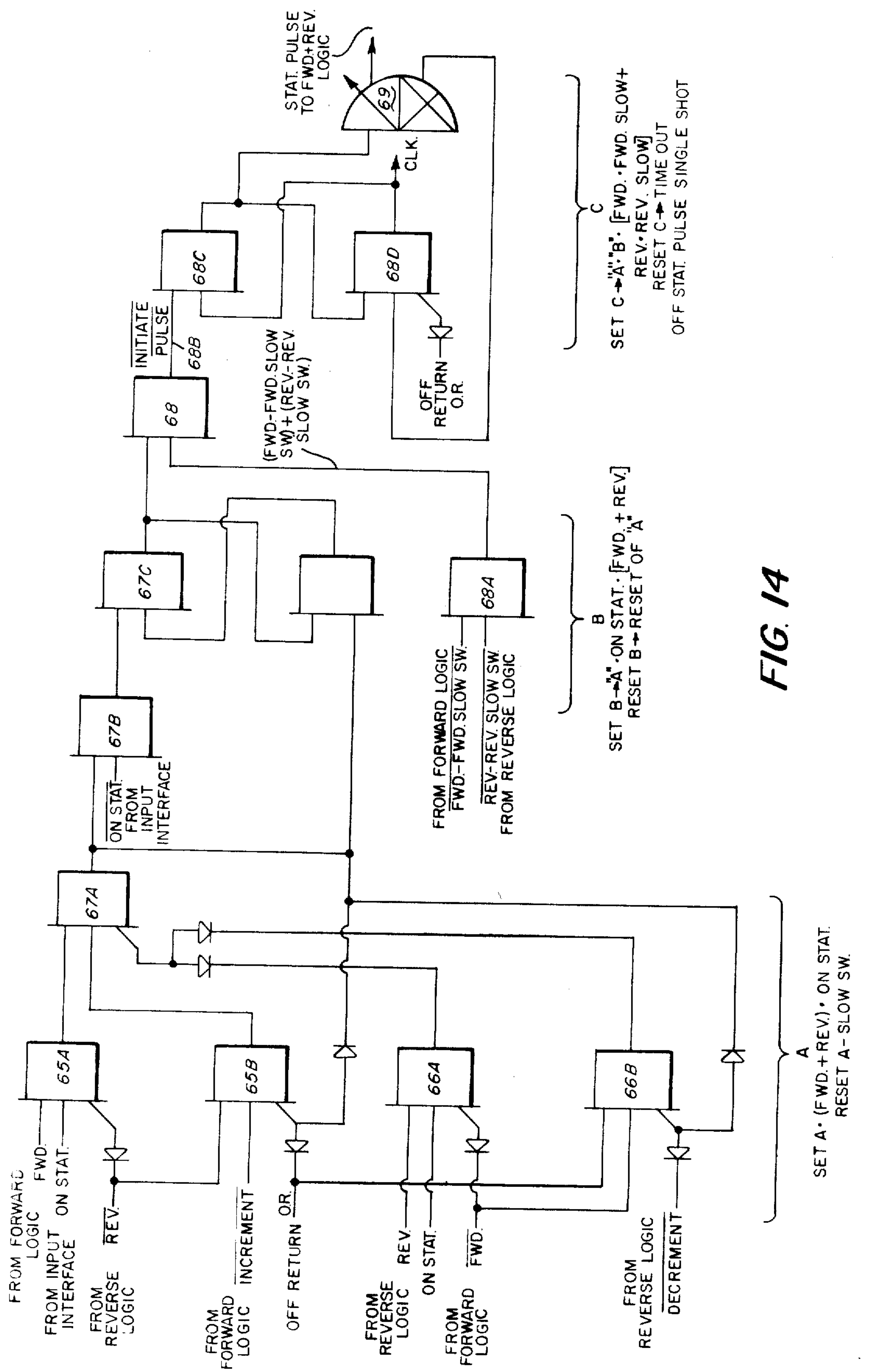
FIG. 14 is a logic diagram of the counting pulse logic of this invention.

In this system we are concerned with recognizing each station as it is passed. The logic of FIG. 14 is used to generate a station (STAT) pulse and a (CLK) pulse in moving from one station to the next station. The CLK pulse is subsequently used to increment the location counter shown in FIG. 16. When the count of the location counter compares with the station code from the instruction drivers of FIG. 12 the location comparator of FIG. 18 generates a signal indicating that the desired station has been reached.

Referring now to FIG. 14 there is shown the counting pulse logic for generating the station (STAT) pulse. The gates 65A and 65B are concerned with forward operation and the gates 66A and 66B are concerned with reverse operation. The station pulse is generated, not when the wagon is on station, but after the wagon leaves a station. Thus, assuming that the wagon is progressing in the forward direction and is initially on station the gate 65A has a low output which causes the output of gate 67A to be high. This high output enables gate 67B. When the wagon leaves the station the output of gate 65A goes high but the output of gate 65B remains low maintaining the output of gate 67A high because the $\overline{\text{INCREMENT}}$ signal is still high. The increment signal is only generated when a station pulse has occurred and travel is in the forward direction (see FIG. 8). When the station is left the $\overline{\text{ON STAT}}$ input to gate 67B goes high and the output of gate 67B is low. The output of gate 67C is high and one input to gate 68 is therefore enabled. Both inputs to gate 68 must be high in order to initiate the station pulse. Thus, up to this point we have been on station, left the station, and are proceeding towards the next station but have not yet initiated the station pulse. Gate 68A controls initiation of the station pulse in that if either the FWD–FWD SLOW SW or the REV-REV SLOW SW signals are present, the output of gate 68A goes high and INITIATE line 68B goes low. This low signal is coupled by way of gate 68C to one input of timer 69 causing the output of the timer to go to ground generating a negative-going pulse for a duration dependent upon the interval of the timer 69. The gate 68D is a latching gate that holds the timer on until it has timed out. Gate 68D also provides the CLK signal.

When the STAT pulse appears and, for example, travel is in the forward direction, then the increment signal (see FIG. 8) is generated causing the output of gate 67A to go low and essentially reset the circuit of FIG. 14, terminating the initiate pulse on line 68B and resetting the timer 69. For the reverse mode the operation is essentially the same except that a $\overline{\text{DECREMENT}}$ signal is coupled to gate 66B for resetting the circuit of FIG. 14 after the STAT pulse has been generated.

Figure 15:
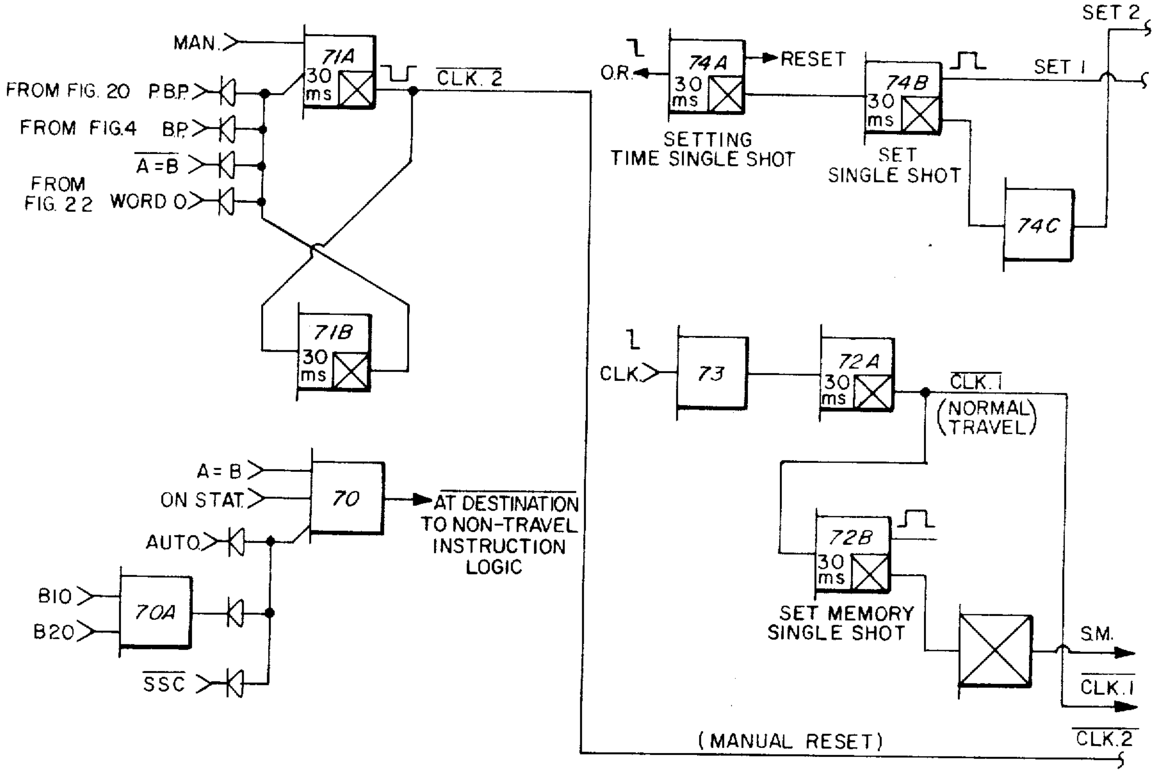
FIG. 15 is a logic diagram of the interval timing logic of this invention.
Figures 16, 17:
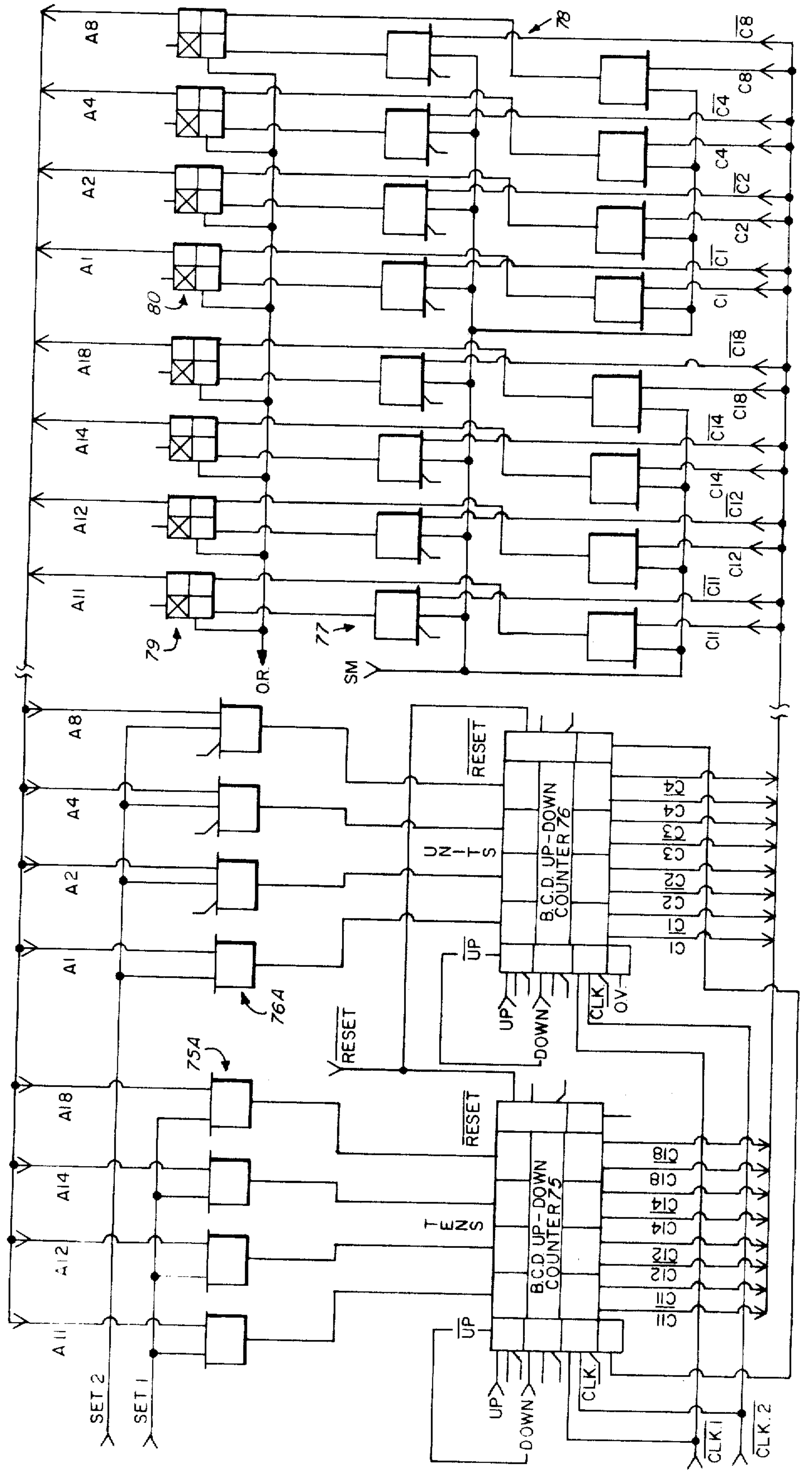
FIG. 16 shows the location counter of this invention.
FIG. 17 shows the retentive memory associated with the counter of FIG. 16.

FIG. 15 shows the interval timing logic that is used to control the location counter shown in FIG. 16 and also the transfer of data between the location retentive memory of FIG. 17 and the location counter of FIG. 16. The gate 70 shown in FIG. 15 senses when the destination has been reached for a travel instruction. For travel instructions, the bits B10 and B20 are not both high but one of them must be low and therefore the output of gate 70A is high. Because the AUTO signal is high, we have reached a station (ON STAT), and the comparator indicates that A=B or that we have reached the desired station, then the output of gate 70 goes low generating the AT DESTINATION signal which is coupled to the non-travel instruction logic of FIG. 13 for subsequently incrementing the memory as discussed hereinafter.

FIG. 15 includes a pair of one-shots 71A and 71B which are conventionally intercoupled to provide a train of clock pulses at the output CLK2, provided certain conditions are met. These pulses are generated under the condition that the MAN signal is present (in manual operation), the preset base position switch has been thrown, we are not at destination as A=B is not satisfied and $\overline{\text{WORD 0}}$ has been set. Under these conditions the $\overline{\text{CLK2}}$ signal periodically runs clocking the counter of FIG. 16 until a preset state in agreement with WORD 0 is reached at which time one-shot 71A is inhibited and no further clock pulses occur. The presetting of base position is discussed in more detail hereinafter with reference to FIG. 22.

FIG. 15 also includes a pair of one-shots 72A and 72B. The one-shot 72A receives its input by way of gate 73 from the CLK signal which is generated at the output of the counting pulse logic of FIG. 14. The CLK signal goes to ground at commencement of the station pulse and some time later determined by the time interval of one-shot 72A of $\overline{\text{CLK1}}$ pulse is generated of a duration dependent upon the time setting of one-shot 72A. At the end of this time period one-shot 72B is initiated and positive output pulses SM1 and SM2 are generated. These pulses are coupled to the retentive memory of FIG. 17 for controlling transfer of the count in the counter of FIG. 16 to the retentive memory of FIG. 17. The $\overline{\text{CLK1}}$ pulse from one-shot 72A is used to clock the location counter.

FIG. 15 also includes one-shots 74A and 74B which couple from the OR (off return) signal. This portion of the circuitry along the AND gate 74C provides signals SET 1 and SET 2. If the system of the present invention should lose power the OR signal goes to ground causing the last count in the retentive memories of FIG. 17 to be transferred to the counter of FIG. 16 thereby storing in the counters the previous count before the loss of power. This enables operation to continue when power is restored without having to preset the counter from a base position station.

FIGS. 16–19, respectively, show the wagon location counter, location retentive memory, wagon location comparator, and automatic travel logic of the present invention. This portion of the system is for keeping track of the location of the wagon at all times during a travel instruction and determining when the proper predetermined location has been reached at which time the AT DESTINATION signal (FIG. 15) is generated. The interval timing logic of FIG. 15 generated five basic signals which are the SET1, SET2, SM, $\overline{\text{CLK1}}$, and $\overline{\text{CLK2}}$ signals. The SET1 and SET2 signals are generated during a power failure or any other situation that would cause the OR signal to go low. The $\overline{\text{CLK1}}$ and $\overline{\text{CLK2}}$ signals are used to clock the counter of FIG. 16, and the SM signal control transfer of data from the counter to the location retentive memory of FIG. 17.

Figures 18, 19:
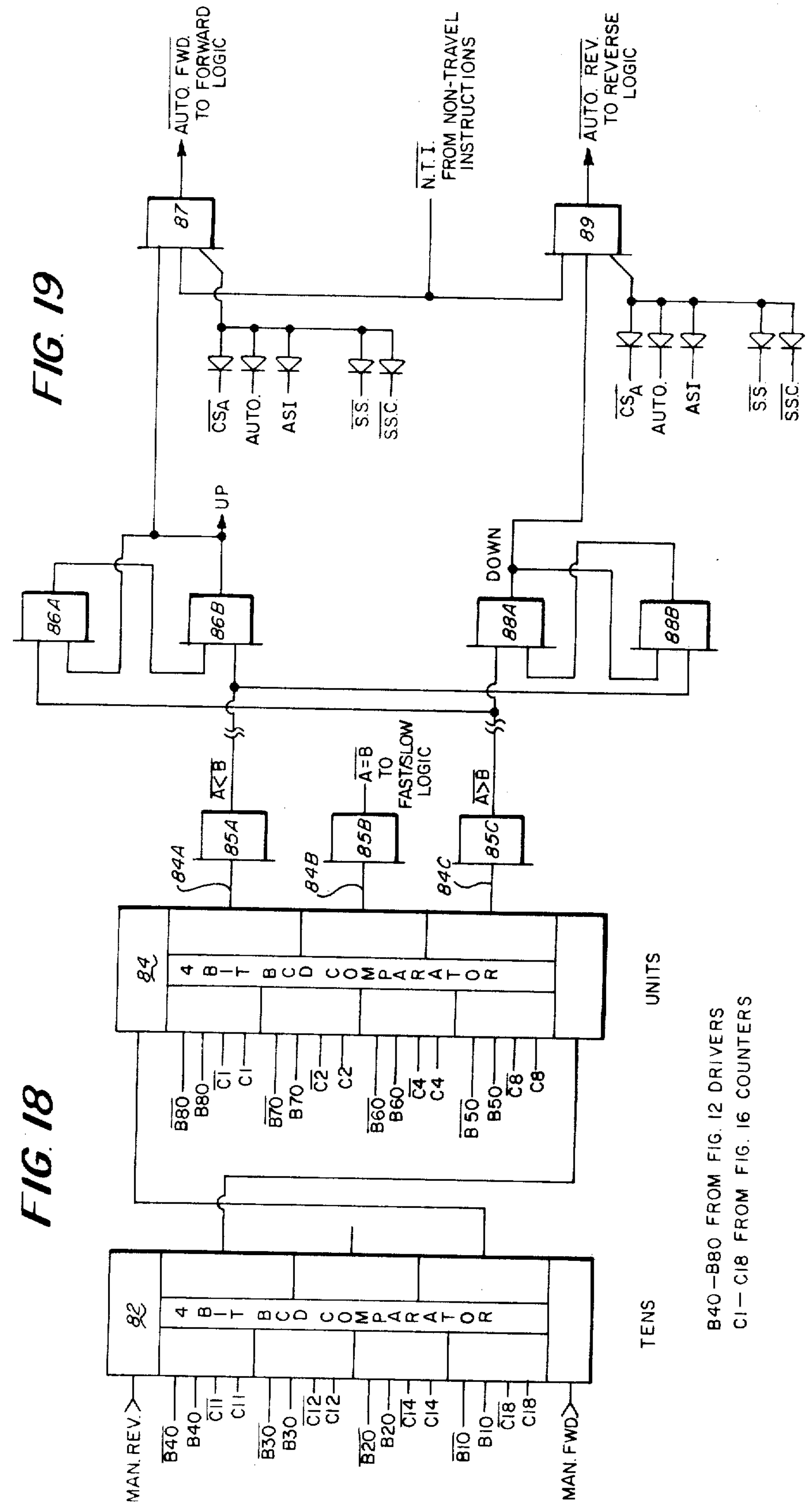
FIG. 18 shows the location comparator of this invention.
FIG. 19 is a logic diagram of the automatic travel logic of this invention.

The wagon location counter shown in FIG. 16 may be considered a single eight bit counter but is shown schematically as two four bit counters 75 and 76. Counter 75 is a BCD up-down counter for the tens digit and counter 76 is a BCD up-down counter for the units digit. The counters 75 and 76 of FIG. 16 and circuitry of FIGS. 17 and 18 are of the type manufactured and sold by the Tenor Company referred to hereinbefore. Each of these counters 75 and 76 receives a reset signal from gate 74A of FIG. 15 at power-up and is clocked either up or down as controlled by the UP and $\overline{\text{UP}}$ signals from the $\overline{\text{CLK1}}$ signal which in turn is generated each time a station is passed, for example. There are four input lines to each of the counters in FIG. 16 coupled from the NAND gate groups 75A and 76A associated with counter 75 and 76, respectively. Some inputs to each of the gates of groups 75A and 76A couple from the location retentive memory of FIG. 17 which is discussed in more detail hereinafter. These two groups of gates assure that if power is lost the contents of the location retentive memory is not destroyed but is transferred back to the counter by means of the SET1 and SET2 signals at the next power-up.

There are also eight output lines from each of the counters 75 and 76 which couple to the location retentive memory of FIG. 17. Eight lines are associated with the four bits of each counter as both the assertion and negation outputs are sensed by the memory of FIG. 17.

Thus, the signal on $\overline{\text{CLK1}}$ line causes the counters 75 and 76 to increment either up or down and the output of the counters which also couples to the comparators of FIG. 18 is sensed until the proper predetermined station is reached. When the PBP signal is present and the base position is sensed as indicated by the circuitry including gates 71A and 71B, the signal $\overline{\text{CLK2}}$ is terminated at the base position.

The location retentive memory of FIG. 17 includes a first group 77 of eight NAND gates associated with the tens counter 75 and a second group 78 also of eight NAND gates associated with the units counter 76. The outputs of these counters 75 and 76 are transferred to the two memory groups 79 and 80 via groups 77 and 78, respectively, under control of signal SM. It is recalled that the signal SM occurs after the clocking of the counters 75 and 76 and thus, it is only after a new count has been moved too, that the data is transferred to memory groups 79 and 80. The OR signal to these groups 79 and 80 holds the information in these memories if power is lost and the SET1 and SET2 signals transfer this retained data back into the up-down counters 75 and 76.

FIG. 18 shows the comparators 82 and 84 each of which is a four bit comparator. The comparator 84 for example, receives C1 and $\overline{C1}$ signals which are coupled from counter 76 and compares that bit of information with the B80 and $\overline{B80}$ signals from the instruction drivers of FIG. 12. The connection between the comparators 82 and 84 is conventional in accordance with the logic illustrated. The output of comparator 84 can be in one of three states indicated by the logic levels on output lines 84A, 84B, and 84C. When the count in the memory is less than the program count then line 84A is high and the corresponding low signal is coupled to the automatic travel logic of FIG. 19. Alternatively, when the count of the counter is greater than the program count, line 84C is high and this signal is also coupled to the automatic travel logic of FIG. 19. When the two counts are equal indicating that the desired station has been reached, line 84B goes high and output of gate 85B which is $\overline{A=B}$ goes low. This signal is coupled to the fast/slow logic shown in FIG. 11 for controlling the speed of the wagon when approaching destination to drop it from a fast speed of operation to a slow speed.

FIG. 19 includes gates 86A and 86B, gate 86B of which receives a signal from comparator 84 by way of gate 85A. When output line 84A goes high the UP signal from gate 86B is also high enabling one input to gate 87. FIG. 19 also includes gates 88A and 88B, gate 88A of which receives a signal by way of gate 85C from comparator 84. When the signal on output line 84C of comparator 84 goes high the DOWN signal also goes high indicating that a DOWN count of the counter is desired. The output of gate 88A is one enabling input to gate 89 shown in FIG. 19. There is a second input to gates 87 and 89 which is a common input designated as $\overline{NTI}$. This input is also high when the program instruction is a travel instruction. This signal is coupled from the non-travel instruction logic of FIG. 13A. The gates 87 and 89 also receive a number of other signals which control the respective output signals $\overline{AUTO\ FWD}$ and $\overline{AUTO\ REV}$. These signals can only be present when the system is not in the continuous step mode of operation, is in the AUTO mode of operation and has not received an alarm (AL1.) signal. The $\overline{SS}$ and $\overline{SSC}$ signals must also be present. The $\overline{AUTO\ FWD}$ and $\overline{AUTO\ REV}$ signals are coupled to the forward and reverse logic, respectively, of FIGS. 8 and 9 which have been discussed in detail hereinbefore.

Figures 21, 22:
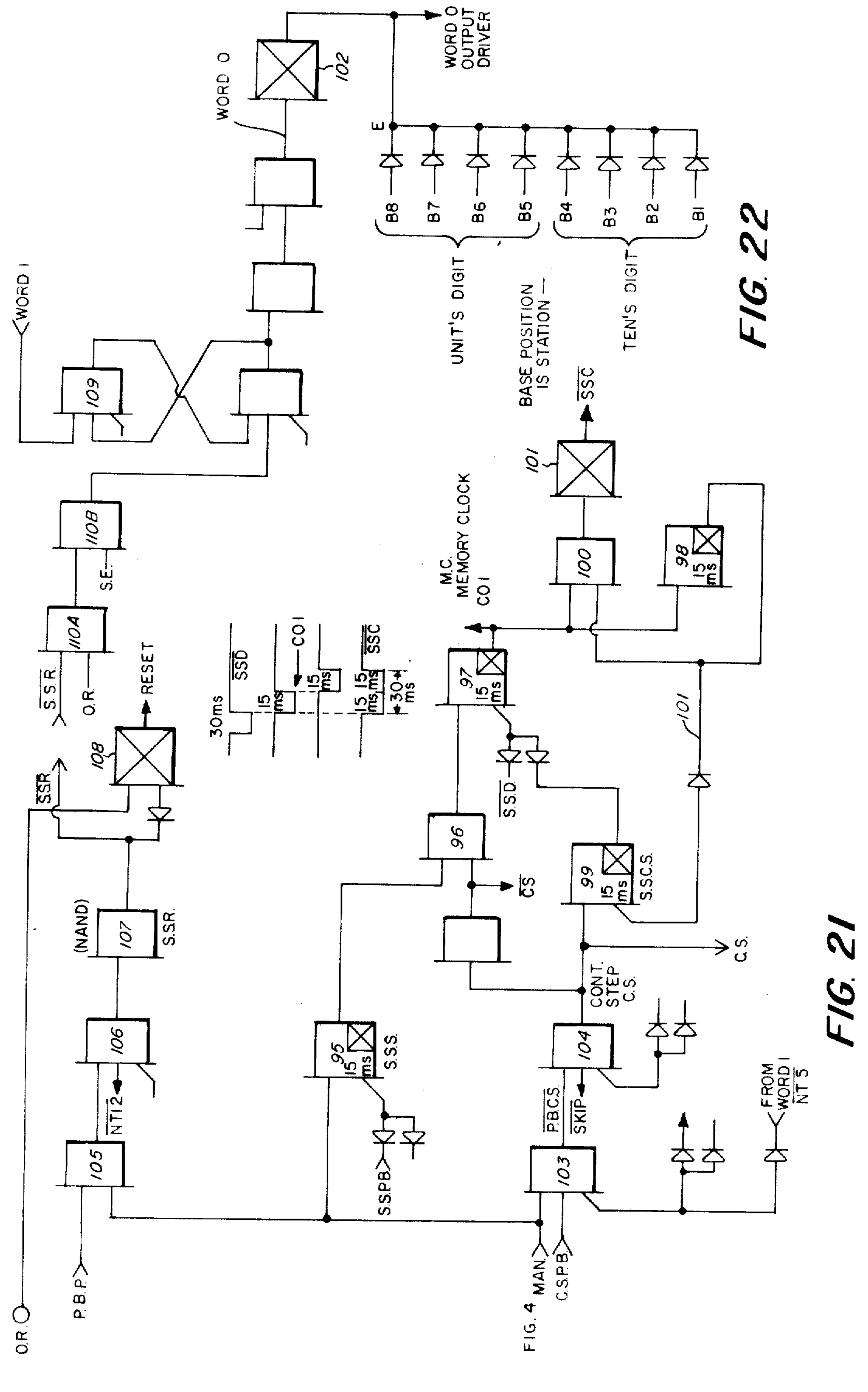
FIG. 21 is a logic diagram of the read only memory timing logic of this invention.
FIG. 22 is a logic diagram of the preset base position logic of this invention.
Figure 25:
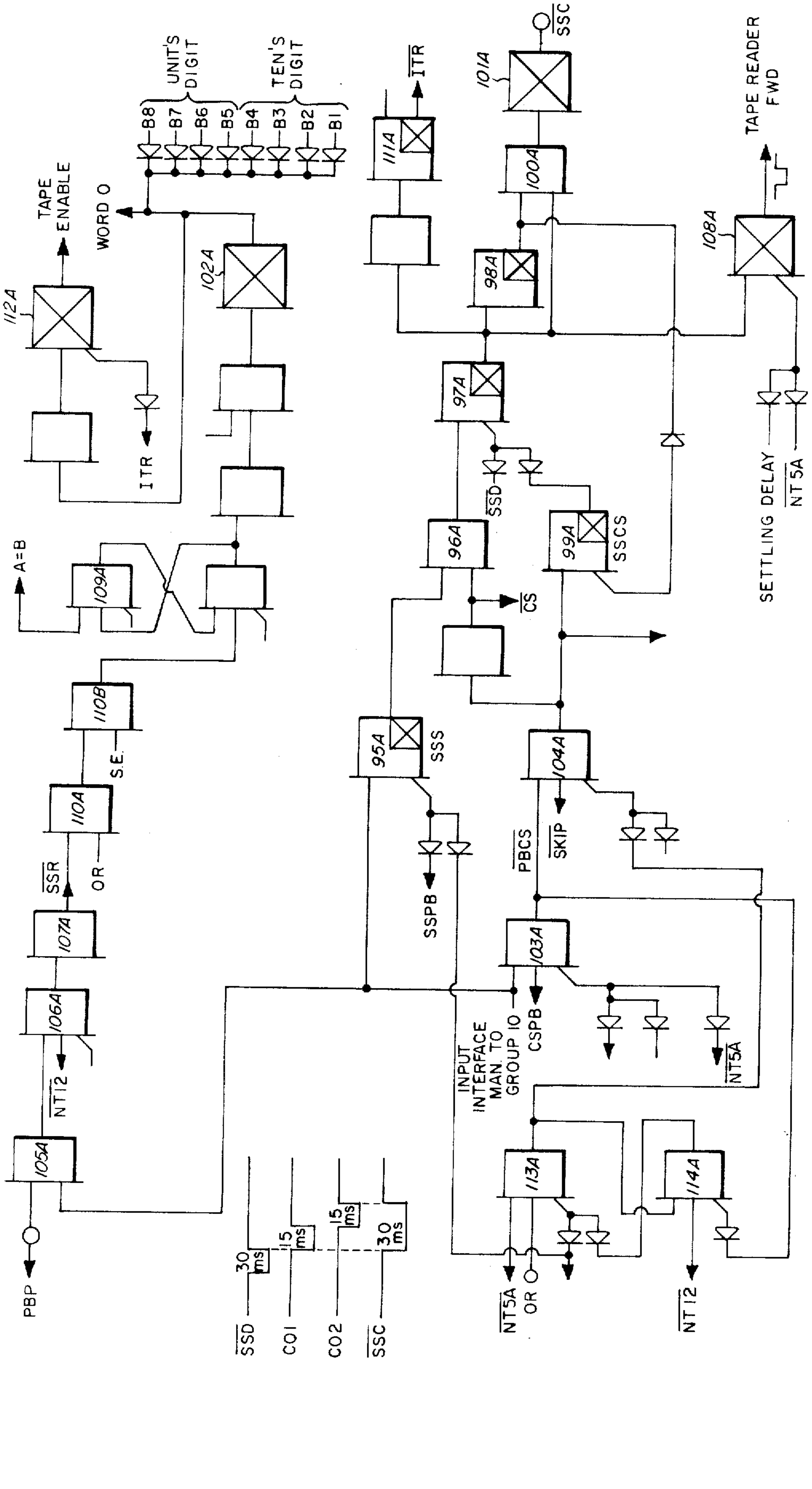
FIG. 25 is a logic diagram showing the tape timing and present base position logic of this invention.

As previously mentioned, the system of this invention can be operated with either a ROM or tape reader at any one time. FIGS. 21-23 refer to the read only memory (ROM). FIGS. 25 and 12A refer to the tape reader models. In either event, the associated control logic shown in FIGS. 21, 22 and 25 generates signals to increment the applied storage device in response to automatic signals or manual push button control, as required.

Figure 20:
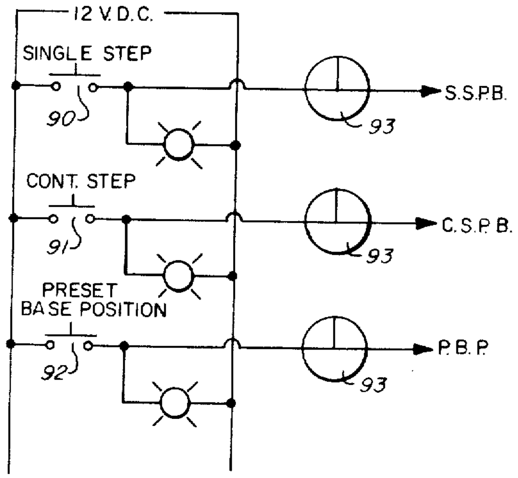
FIG. 20 is a schematic diagram showing the single step, continuous step and preset base position switches.

Referring now to FIG. 20 there is shown a single step switch 90, continuous step switch 91, and the present base position switch 92. Each of these switches are in a normally open position and when closed couple signals by way of logic interfaces 93 to the logic shown in FIG. 21. The three output signals are designated as the single step push button (SSPB), continuous step push button (CSPB), and present base position push button (PBP).

In FIG. 21 (ROM operation) the MAN signal is effectively used to enable operation of any of the signals generated from the push buttons shown in FIG. 20. For example, when the single step push button 90 has been depressed and the system is in manual operation the SSPB signal goes high. The one-shot 95 couples a 15 millisecond delayed pulse by way of gate 96 and one-shot 97 to cause a memory clock (MC) pulse at the output of one-shot 97. This memory clock pulse is coupled to the read only memory (ROM) of FIG. 23 for causing an incrementing of the memory to the next program instruction. The output of gate 101 is the $\overline{SSC}$ signal which is used throughout this system for control of data transfer to inhibit any transfer during memory clocking. Thus, for each depression of the single step push button 90 a single memory clock pulse is generated for incrementing the ROM of FIG. 23.

The ROM of FIG. 23 is reset by the RESET signal provided at gate 108 in FIG. 21 when $\overline{NT12}$ is read at the completion of a normal automatic cycle or when the PBP signal is present. The $\overline{SSR}$ signal causes a latching of the base position code thus displaying the BCD code for the base position station assigned (see B1-B8, FIG. 22). In manual operation, the PBP switch also energizes the CLK2 signal which is coupled to the location counter, causing it to preset WORD 0 code displayed (FIG. 15). In automatic operation, the agreement of the displayed code against the location counter, whose last entry was arrival at base position, causes the memory to single step from reset via $\overline{SSD}$ signal and advance to WORD 1. Arrival at WORD 1 resets STEP 0 display via gate 109 (FIG. 22). In this manner, the word 0 is utilized as a counter check and feedback bridge between end and beginning of ROM cycles. The output of one-shot 97 increments the ROM.

For tape operation reference is made to FIG. 25. When power is initiated, WORD 0 is set, as above. When WORD 0 is true at the output of gate 102A, tape data inputs are inhibited via tape enable signal at the output of gate 112A. When OR comes high after some predetermined time, WORD 0 is reset via A=B provided that STEP 0 code equals the location count preset into the location counter herinbefore discussed. If there be disagreement, the STEP 0 code will continue to be displayed and thus tape data is blanked. Switching to manual and energizing PBP will accomplish the same condition above; however, as previously discussed, PBP will also cause the counter to agree via CLK2 (FIG. 15) and thus insure a positive comparison. This restores the tape data from the line presently being read. The reader position is sustained during this operation to utilize the inherent advantage of step retentive memory pecular to the device.

When coming to the end of a normal tape cycle, $\overline{NT12}$ is read. This initiates a latch signal via circuits 113A and 114A to produce a series of clock pulses to the reader control rapid stepping it in a direction from the end of the cycle to the beginning of the next as programmed on its NO END TAPE. Reading NT12 also sets WORD 0 disabling tape data as discussed above. Once the reader has stepped from NT12, STEP 0 will reset via A=B signal (gate 109A) and restore the tape input provided that code agrees with the counter. Reading of the $\overline{\text{NT5A}}$, as shown in FIG. 13B, unlatches circuits 113A and 114A and thus halts the reader on the first word of the next cycle.

As previously stated, the memory timing circuits are capable of single step or continuous step during either manual or automatic operation. The switches of FIG. 20 are used with either tape or ROM operation.

The function of PBP in respect to ROM or Rea-ers has been hereinbefore explained. Normal program single step is either by SSPB, or directly into gate 97 or 97A via $\overline{\text{SSD}}$ from FIG. 13A. When any input goes low at circuit 97 or 97A (FIGS. 22 or 25) a 15 millisecond single shot is fired whose leading edge enables the basic clock which fires on the trailing edge that follows 15 milliseconds later. The leading edge also inhibits (via $\overline{\text{SSC}}$ function hereinbefore discussed) the response of all system circuits before changing of the instruction. The negation side of circuit 97 (or 97A) also fires a secondary single-shot circuit 98 or 98A (FIGS. 21 or 25) which continues inhibiting control responses until a 15 millisecond time after the instruction increment has transpired (circuits 100, 100A and 101, 101A). The function SSPB in manual, $\overline{\text{SKIP}}$ in automatic and a low from circuit 113A (FIG. 25) will cause the output of circuit 104A (FIGS. 21 and 25) to go high, thus enabling the continuous step mode. A high at the input of circuit 99, 99A in conjunction with a static high from circuit 98, 98A fires the single shot. The output of gate 99, 99A couples into the input of gate 97, 97A, and as previously described, provides a clock pulse output, which in turn fires circuit 98, 98A. When a negation output of gate 98, 98A goes low, then high (15 milliseconds later), it resets and then re-pulses the input of circuit 99, 99A, provided the continuous step signal from gate 104, 104A is still high, In this manner sufficient pulses are generated to satisfy the control requirement; thus, when circuit 104, 104A output goes low, the chain of pulses is terminated.

What is claimed is:

1. In an automatic conveying system, having a wagon moveable between a plurality of stations, motion control apparatus comprising;

means for storing a plurality of multi-bit instruction codes including travel instruction codes and non-travel instruction codes, means for successively reading and decoding each instruction code, one code at a time, means for continuously registering a count representative of the location of the wagon, said means for reading and decoding comprising means for decoding a part of said instruction code to determine if said instruction code is a travel instruction code or a non-travel instruction code, means responsive to the decoding of a non-travel instruction for decoding the remainder of the code, and means responsive to the decoding of a travel instruction for decoding the entire instruction code to determine the next station to which to travel, and means for incrementing said means for storing to the next instruction code upon completion of a non-travel instruction code or upon arrive at a station destination when said travel instruction code compares with said stored count representative of the location of the wagon.

2. The system of claim 1 wherein said means for storing comprises a read only memory and said means responsive to the decoding of a non-travel instruction includes a plurality of decoding gates each responsive to a different non-travel instruction code.

3. The system of claim 1 wherein said means for incrementing includes an AND gate means for receiving a destination signal and a signal representative of the completion of a non-travel instruction, and pulse generating means responsive to the state of said AND gate means for generating an incrementing pulse which is coupled to said means for storing.

4. The system of claim 1 wherein said means for continuously registering a count includes a bidirectional counter and logic means responsive to a decoded travel instruction and the count of said registering means for controlling the direction of counting of said bidirectional counter.

5. The system of claim 4 wherein said logic means includes a comparator means.

6. The system of claim 1 comprising manual means for continuously stepping through said means for storing and means for terminating said continuous stepping when an intial base position non-travel instruction is decoded.

7. The system of claim 1 comprising manual means for single stepping.

8. The system of claim 1 wherein said means for reading and decoding includes means for decoding a field of said code containing more bits than said part of said code to determine if said code is a skip code.

9. The system of claim 8 including logic means responsive to said field and the rest of said code for skipping a predetermined number of instruction codes.

10. The system of claim 1 comprising means for controlling wagon lifting and dropping and timer means responsive to either a lift or drop non-travel code for energizing said timer means.

11. In an automatic conveying system having a wagon moveable between a plurality of stations, motion control apparatus comprising;

means for storing a plurality of multi-bit instruction codes including travel instruction codes and non-travel instruction codes, means for decoding a travel instruction code, means for continuously registering a count representative of the location of the wagon, means for comparing a decoded travel instruction code with the registered location count for incrementing said means for storing to the next instruction code upon receiving a comparison between the code and count, means for decoding a non-travel instruction code, and means responsive to completion of said non-travel instruction for incrementing said means for storing.

12. The system of claim 11 wherein said means for continuously registering includes a location counter and logic means responsive to passing of a station for generating a station pulse for incrementing said location counter.

13. The system of claim 12 wherein said logic means includes a first group of logic gates for establishing a first condition when a station is reached and a second group of logic gates responsive to said first condition being present and said wagon leaving said station.

14. The system of claim 13 including a third group of logic responsive to either a forward or reverse slow down switch.

15. The system of claim 11 wherein said means for decoding a non-travel instruction includes means for decoding a part of said instruction code to determine if the code is a non-travel code and means for decoding a portion of said code containing more bits than are contained in said part to determine if the code is a skip code.

* * * * *